United States Patent
Itogawa

(10) Patent No.: US 11,720,307 B2
(45) Date of Patent: Aug. 8, 2023

(54) IMAGE PROCESSING APPARATUS AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Yoshihiro Itogawa, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/458,833

(22) Filed: Aug. 27, 2021

(65) Prior Publication Data

US 2022/0066715 A1     Mar. 3, 2022

(30) Foreign Application Priority Data

Aug. 31, 2020 (JP) .................. 2020-145805

(51) Int. Cl.
   *G06F 3/12* (2006.01)
(52) U.S. Cl.
   CPC .......... *G06F 3/1262* (2013.01); *G06F 3/1207* (2013.01); *G06F 3/1259* (2013.01); *G06F 3/1276* (2013.01)
(58) Field of Classification Search
   CPC .... G06F 3/1262; G06F 3/1207; G06F 3/1259; G06F 3/1276; G06F 3/1215
   See application file for complete search history.

(56) References Cited

U.S. PATENT DOCUMENTS

| | | | |
|---|---|---|---|
| 9,606,696 B2* | 3/2017 | Oguma | G06F 3/1229 |
| 2002/0131069 A1* | 9/2002 | Wanda | G06F 3/121 |
| | | | 358/1.14 |
| 2006/0192997 A1* | 8/2006 | Matsumoto | G06F 3/1288 |
| | | | 358/1.15 |
| 2006/0209330 A1* | 9/2006 | Mitsui | G06F 3/1205 |
| | | | 358/1.15 |
| 2007/0201045 A1* | 8/2007 | Morales | G06F 3/1242 |
| | | | 358/1.15 |
| 2012/0307301 A1* | 12/2012 | Otomaru | G03G 15/502 |
| | | | 358/1.15 |
| 2013/0077112 A1* | 3/2013 | Dodd | G06K 15/4025 |
| | | | 358/1.16 |
| 2019/0155554 A1* | 5/2019 | Yan | G06F 3/1285 |
| 2019/0163422 A1* | 5/2019 | Matsuo | G06F 3/1262 |

FOREIGN PATENT DOCUMENTS

JP     2002-234237 A     8/2002

* cited by examiner

*Primary Examiner* — Huo Long Chen
(74) *Attorney, Agent, or Firm* — Scully, Scott, Murphy & Presser, PC

(57) ABSTRACT

There is provided an image processing apparatus which is provided with a communication interface, and a controller. When multiple print jobs are received via the communication interface, the controller is configured to analyze information included in each of the multiple print jobs, and handle the multiple print jobs as one print job when, as a result of analysis, it is determined that the information satisfies a particular condition.

14 Claims, 17 Drawing Sheets

FIG. 5

| No | PRINT INSTRUCTION | NUMBER OF COPY COMMAND | PRINT DATA | PRINT RESULT |
|----|---|---|---|---|
| 1 | MULTIPLE COPY UNIT OF COPY: ON | N/A | [1 2 3 1 2 3] | 1 2 3 1 2 3 |
| 2 | MULTIPLE COPY UNIT OF COPY: ON | @PJL SET QTY=2 | [1 2 3] | 1 2 3 1 2 3 |
| 3 | MULTIPLE COPY UNIT OF COPY: OFF | @PJL SET COPIES=2 | [1 2 3] | 1 1 2 2 3 3 |
| 4 | SINGLE COPY | N/A | [1] [2] [3] | 1 2 3 |

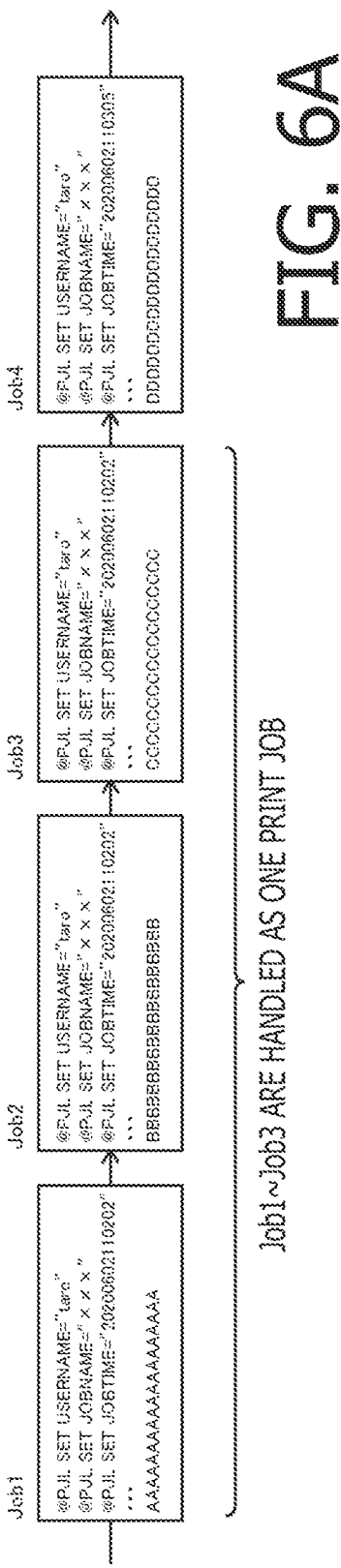
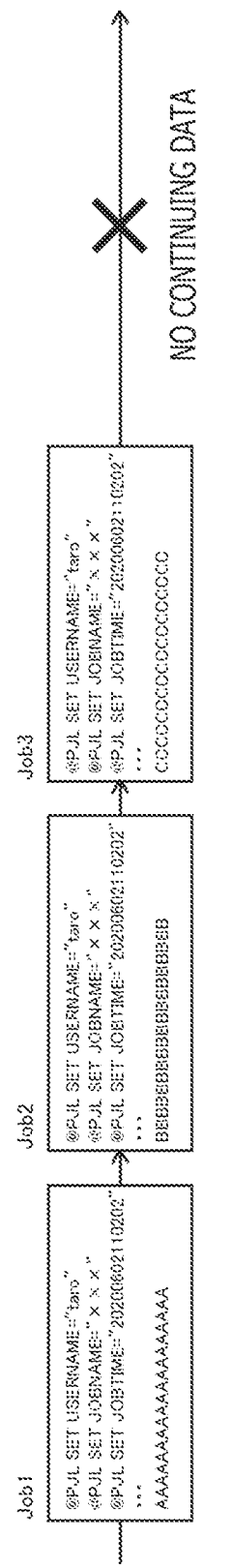

IMAGE PROCESSING APPARATUS AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-145805 filed on Aug. 31, 2020. The entire subject matter of the application is incorporated herein by reference.

BACKGROUND

Technical Field

The present disclosures relate to printing technology of receiving a print job and executing printing based on the received print job.

Related Art

There has been known an image processing apparatus which is configured such that, when performing a multiple-copy printing, the image processing apparatus measures a time period required for printing a first copy and displays a remaining time period for completing all the copies in addition to the number of remaining copies and the number of remaining pages to be printed for the second and subsequent copies.

SUMMARY

In the above-described conventional technique, however, when receiving multiple print jobs which could be treated as a single print job, the image processing apparatus may not be able to treat the multiple print jobs as a single print job.

According to aspects of the present disclosures, there is provided an image processing apparatus having a communication interface and a controller. When multiple print jobs are received via the communication interface, the controller is configured to analyze information included in each of the multiple print jobs, and handle the multiple print jobs as a single print job when, as a result of analysis, it is determined that the information satisfies a particular condition.

According to aspects of the present disclosures, there is also provided a non-transitory computer-readable recording medium for an image processing apparatus having a communication interface and a controller, the recording medium containing computer-readable instructions which cause, when executed by the controller, the image processing apparatus to perform analyzing, when multiple print jobs are received via the communication interface, information included in each of the multiple print jobs, and handling the multiple print jobs as one print job when, as a result of analyzation, it is determined that the information satisfies a particular condition.

BRIEF DESCRIPTION OF THE DRAWINGS

FIG. 5 shows various types of print jobs.

FIGS. 6A and 6B show examples of treating a plurality of print jobs as a single print job.

DETAILED DESCRIPTION OF THE EMBODIMENT

Hereinafter, referring to the accompanying drawings, an embodiment according to aspects of the present disclosures will be described.

Figure 1:
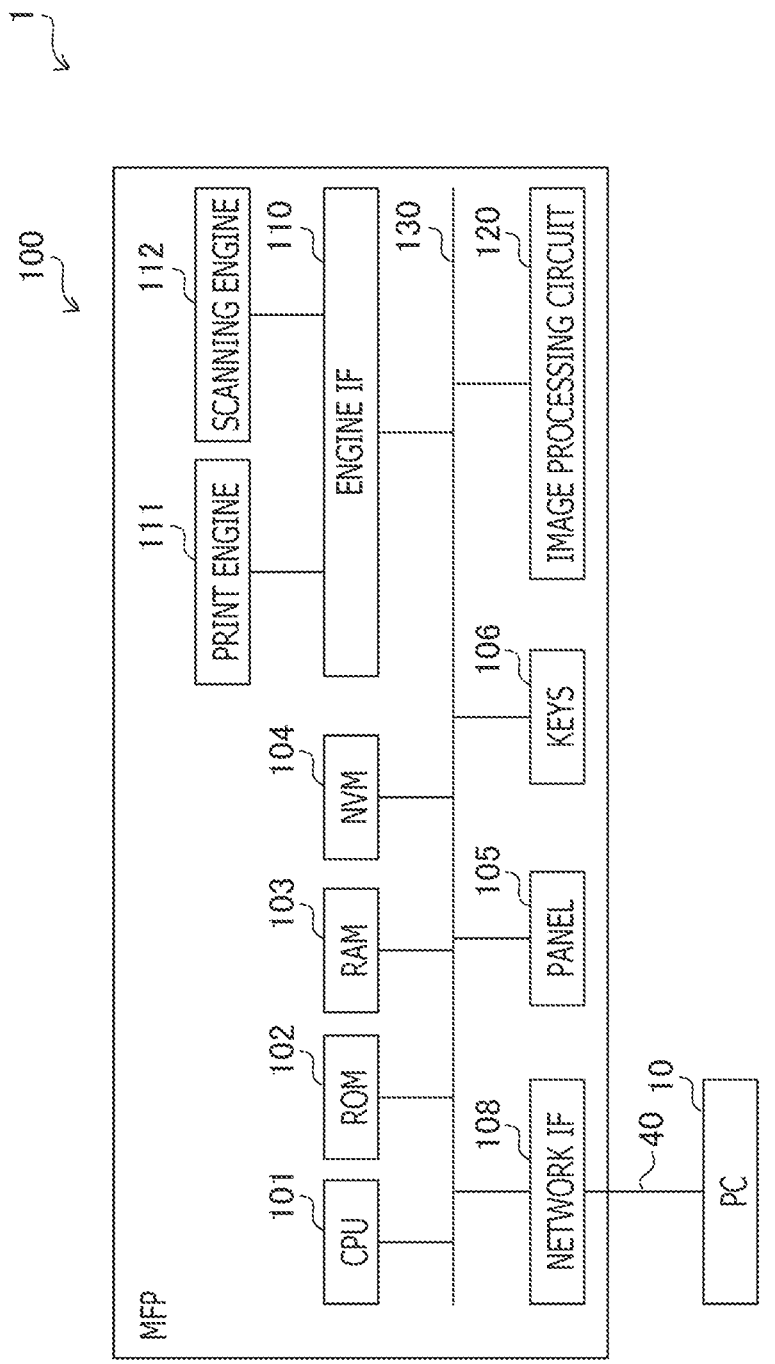
FIG. 1 is a block diagram of an MFP (Multi-Function Peripheral) and a PC (personal computer) of an image processing system according to an embodiment of the present disclosures.

FIG. 1 is a block diagram showing a control configuration of an image processing system 1 including an MFP 100 (an example of an image processing apparatus) according to aspects of the present disclosures and a PC 10. It is noted that the MFP is an abbreviation for "multifunction peripheral."

The MFP 100 is a multi-functional peripheral equipped with a facsimile function, a scanning function and a printing function. The MFP 100 has a CPU 101, a ROM 102, a RAM 103 and an NVM 104. It is noted that the NVM is an abbreviation for "non-volatile memory."

The CPU 101 is configured to control the overall operation of the MFP 100. In particular, the CPU 101 controls a print engine 111 and a scanning engine 112 via an engine IF 110.

The ROM 102 is configured to store control programs (including a program for a main process described later with reference to FIG. 7). The CPU 101 is configured to read out the control programs from the ROM 102 to perform various processes. The RAM 103 is configured to temporarily store image data and others. The RAM 103 is also used as a storage area temporarily storing data and/or signals or as a working area when the CPU 101 executes the control programs. The NVM 104 is a non-volatile memory configured to store setting information to be retained even when the MFP 100 is powered off.

The MFP 100 is further configured to have a panel 105 and keys 106. According to the present embodiment, the panel 105 is configured as a touch panel. The panel 105 is configured to display various screens depending on a state of the MFP 100. A user can perform input operations by touching input buttons displayed on the screen. It is noted that an expression "touching an input button displayed on the screen" may also be expressed as "pressing an input button displayed on the screen" in this specification. The keys 106 are hard keys which are keys formed by hardware. The keys 106 may include, for example, a power switch, a reset switch and numeric keys.

The MFP 100 is provided with a network IF 108. The network IF 108 is configured to connect the MFP 100 to a communication network 40. According to the present embodiment, since the PC 10 is connected to the communication network 40, the MFP 100 is capable of transmitting and receiving various pieces of data to and from the PC 100.

The MFP 100 is provided with an engine IF 110, to which the print engine 111 and the scanning engine 112 are connected. The print engine 111 is configured to print images on a sheet and may adopt an electrophotographic imaging technology, an inkjet printing technology, a thermal printing technology or the like. The scanning engine 112 is configured to scan images formed on an original document and may have an image scanning element such as a CCD, a CIS or the like. The engine IF 110 is an interface (IF) which is configured to control the print engine 111 and the scanning engine 112. The engine IF 110 may include an interface for the print engine 111 and an interface for the scanning engine 112.

Further, the MFP 100 has an image processing circuit 120 configured to rasterize image data of a print job and output the rasterized data to the print engine 111. The image processing circuit 120 is also configured to process the image data scanned from the original document using the scanning engine 112 to generate digital data. The image data processed into digital data may be transmitted to an external device via the network IF 108 or provided to the print engine 111 so that an image is formed on a sheet based on the digital data.

The CPU 101, the ROM 102, the RAM 103, the NVM 104, the panel 105, the keys 106, a USB IF 107, the network IF 108, the engine IF 110 and the image processing circuit 120 are connected with each other via a bus 130. It is noted that the CPU 101 may function as the image processing circuit 120 by executing an image processing program.

It is noted that, in the specification, processes are described to be performed as the CPU 101 executes instructions described in the programs. In other words, in the following description, processes of "determining," "extracting," "selecting," "calculating," "deciding," "identifying," "obtaining," "receiving," "controlling," and "setting" mean process performed by the CPU 101. The processes performed by the CPU 101 include hardware control through the OS. It should be noted that the term "obtaining" is used to mean a concept which does not require "requesting." In other words, a process of receiving data without a request from the CPU 101 is also included within the concept that "the CPU 101 obtains data."

In addition, the term "data" in the description is represented by computer-readable bit strings. The data of which meaning is substantially the same, but the format is different is treated as the same data. The term "information" in this description is treated in the same manner as the term "data." The processing such as "command," "order," "response," and "request" is executed by communicating information indicating "command," "order," "response," and "request." Further, the terms "command," "order," "respond," "request," and the like may be used to mean information itself representing "command," "order," "respond," "request," and the like, respectively.

Figure 7:
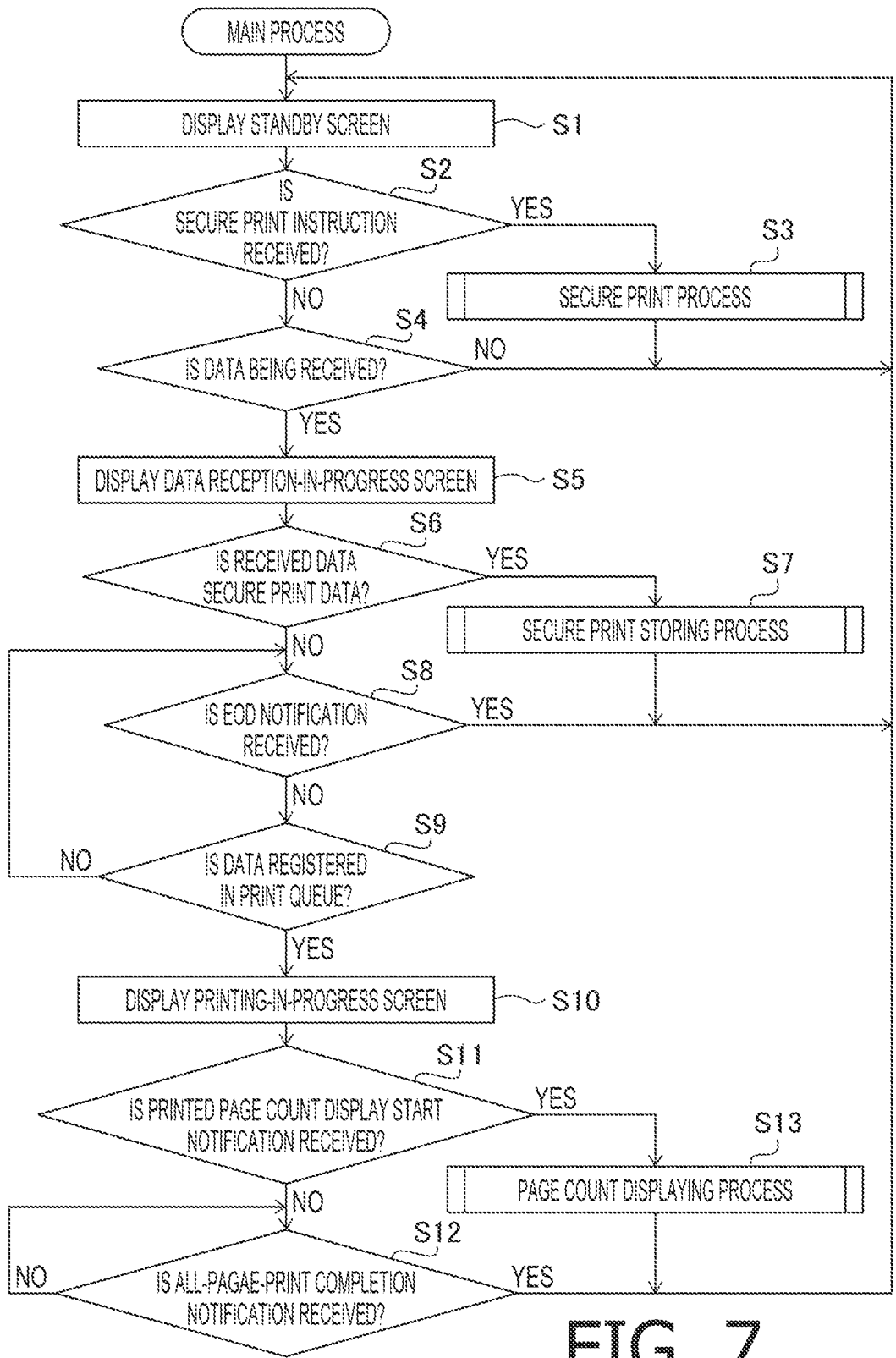
FIG. 7 is a flowchart illustrating a main process.

FIG. 7 shows procedures of a main process performed by the CPU 101 of the MFP 100. The main process is launched in response to a power switch included in the keys 106 being turned ON. Hereinafter, a "step" indicating a step number is represented by a letter "S" in the description.

Figure 2A:
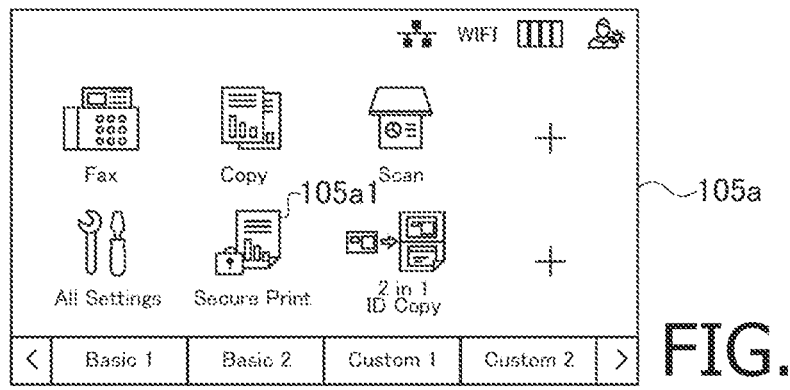
FIG. 2A-FIG. 2E show an example of a transition of a display on a panel of the MFP shown in FIG. 1.

In FIG. 7, the CPU 101 displays a standby screen on the panel 105 (S1). FIG. 2A shows an example of the standby screen 105a displayed on the panel 105. On the standby screen 105a, a Fax icon, a Copy icon, a Scan icon, a Secure Print icon 105a1 and others. It is noted that other standby screens different from the standby screen 105a may be displayed on the panel 105 when a button such as "Basic1," "Basic2," "Custom1," or "Custom2" is pressed.

Returning to FIG. 7, the CPU 101 determines whether the user operates to issue a secure print instruction (S2). The secure print instruction is made through a secure print screen displayed on the panel 105 when a secure print mode is selected. The secure print mode is selected by pressing the Secure Print icon 105a1 displayed on the standby screen 105a and by inputting login information through the login screen displayed in response to the pressing of the Secure Print icon 105a1. When the login is performed successfully, the secure print mode is selected, and the secure print screen is displayed on the panel 105. It is noted that the secure print mode is an example of an "accumulation print mode."

When it is determined that the user issued the secure print instruction (S2: YES), the CPU 101 performs the secure print process (S3) and then returns the processing to S1. The secure print process will be described in detail later with reference to FIG. 10.

When it is determined that the user did not issue the secure print instruction (S2: NO), the CPU 101 determines whether the MFP 100 receives data (S4). It is noted that the "data" here means data constituting a print job.

Figure 4A:
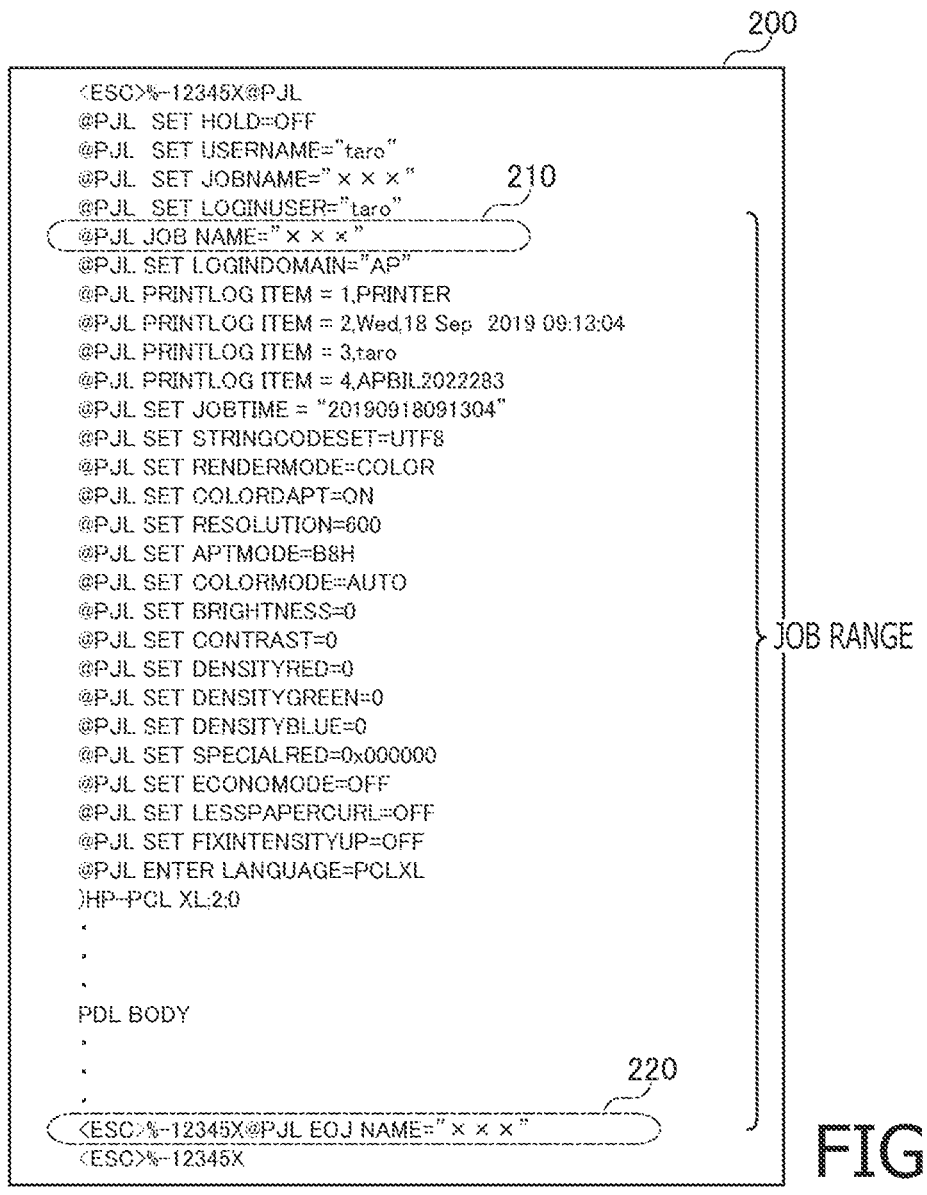
FIGS. 4A and 4B show examples of data constituting print jobs.
Figure 4B:
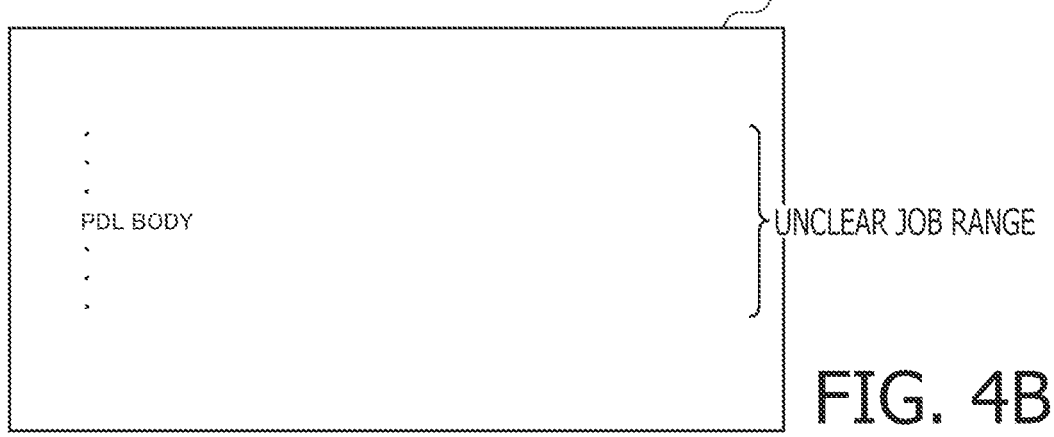

FIG. 4A shows data 200 which is an example of the print job and FIG. 4B shows data 300 which is another example of the print job. In FIG. 4A, a range in which the print job is defined is clear, while in FIG. 4B, a range of the print job is unclear (i.e., the range of the print job is not clearly defined).

The data 200 is configured such that, as shown in FIG. 4A, a PDL section is sandwiched by PJL sections. It is noted that the "PDL" is an abbreviation for "page description language," and that the "PJL" is an abbreviation for "printer job language." The print job in the data 200 is defined within a range from a description line 210 ("@PJL JOB NAME="XXX"") to a description line 220 ("<ESC>%-12345X@PJL EOJ NAME="XXX""). In other words, the description lines 210 and 220 serve as delimiter lines of the print job. Further, the start line of the data 200 is "<ESC>%-12345X@PJL," while the end line of the data 200 is "<ESC>%-12345X." Therefore, when the data subjected to be received in S4 is the data 200, the CPU 101 determines whether or not the data is received by determining whether or not the "<ESC>%-12345X@PJL" is detected.

On the other hand, as shown in FIG. 4B, the data 300 does not have description lines corresponding to the description lines 210 and 220 shown in FIG. 4A. Therefore, in the data 300, the range of the print job is unclear.

Figure 2B:
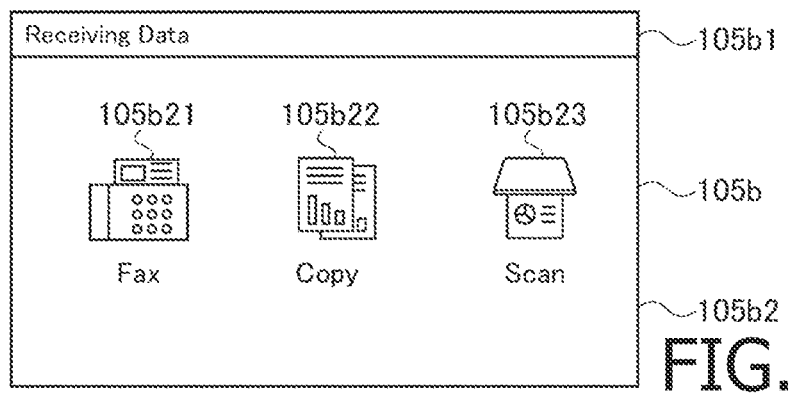

Returning to FIG. 7, when it is determined that the MFP 100 receives the data (S4: YES), the CPU 101 displays a data reception-in-progress screen on the panel 105 (S5), and then advances the process to S6. FIG. 2B shows an example of the data reception-in-progress screen 105b. The data reception-in-progress screen 105b includes a status area 105b1 which shows an operating status of the MFP 100 and a process changing area 105b2 for changing the process of the MFP 100 to an image forming process other than the process based on the print job. According to the present embodiment, a Fax icon 105b21, a Copy icon 105b22 and a Scan icon 105b23 are displayed in the process changing area 105b2. When the Fax icon 105b21, the Copy icon 105b22 or the Scan icon 105b23 is pressed by the user, a Fax process, a Copy process or a Scan process is performed as an interruption process during execution of the print job. When such an interruption process is performed, a display on the panel 105 is changed to one of screens indicating the Fax process, the Copy process and the Scan process performed as the interruption process. It is noted that an "icon" is an example of an "object image." A button image and a text image are other examples of the object image.

Returning to FIG. 7, when it is determined that the MFP 100 does not receive data (S4: NO), the CPU 101 returns the process to S1. As far as no data is received (S4: NO), S1, S2 and S4 are repeated.

In S6, the CPU 101 determines whether the receiving data is the secure print data. Concretely, the determination is made depending on whether the data which is being received contains the PJL command indicating that the data is the secure print data.

When the MFP 100 is configured to handle all the received data as the secure print data, all the received data is handled as the secure print data.

When it is determined that the data being received is the secure print data (S6: YES), the CPU 101 performs the secure print storing process (S7) and then returns the process to S1. The secure print storing process will be described in detail later with reference to FIGS. 8A and 8B.

When it is determined that the data which is being received is not the secure print data (S6: NO), the CPU 101 advances the process to S8. In S8, the CPU 101 determines whether an EOD (end of data) notification is received. When it is determined that the EOD notification is not received (S8: NO), the CPU 101 determines whether rasterized data has been registered in the print queue in S9. By the execution of S8 and S9, when the CPU 101 receives data of which EOD is notified before the rasterized data has been registered in the print queue, that is, when data that does not contain the print data to be rasterized is received, the CPU 101 returns the process from S8 to S1, and change the screen on the panel 105 from the data reception-in-progress screen to the standby screen. It is noted that the EOD notification is generated in S56 of a job information analyzing process which will be described later with reference to FIGS. 9A and 9B. That is, as described later, the EOD notification will be generated when the job information analyzing process is terminated.

On the other hand, when data is received such that the EOD notification is generated after the rasterized data is registered in the print queue, the CPU 101 cyclically executes S8 and S9 until the rasterized data is registered in the print queue, and when the rasterized data is registered in the print queue, the CPU 101 advances the process to S10.

In the present embodiment, the image processing circuit 120 is configured to generate the rasterized data by applying the rasterizing process to the print data contained in the received data, and registers the rasterized data to the print queue. For example, when the data which is being received is data 200 shown in FIG. 4A, the CPU 101 outputs the PDL data as the image data to the image processing circuit 120. Then, the image processing circuit 120 applies the rasterizing process to the input PDL data.

Figure 9A:
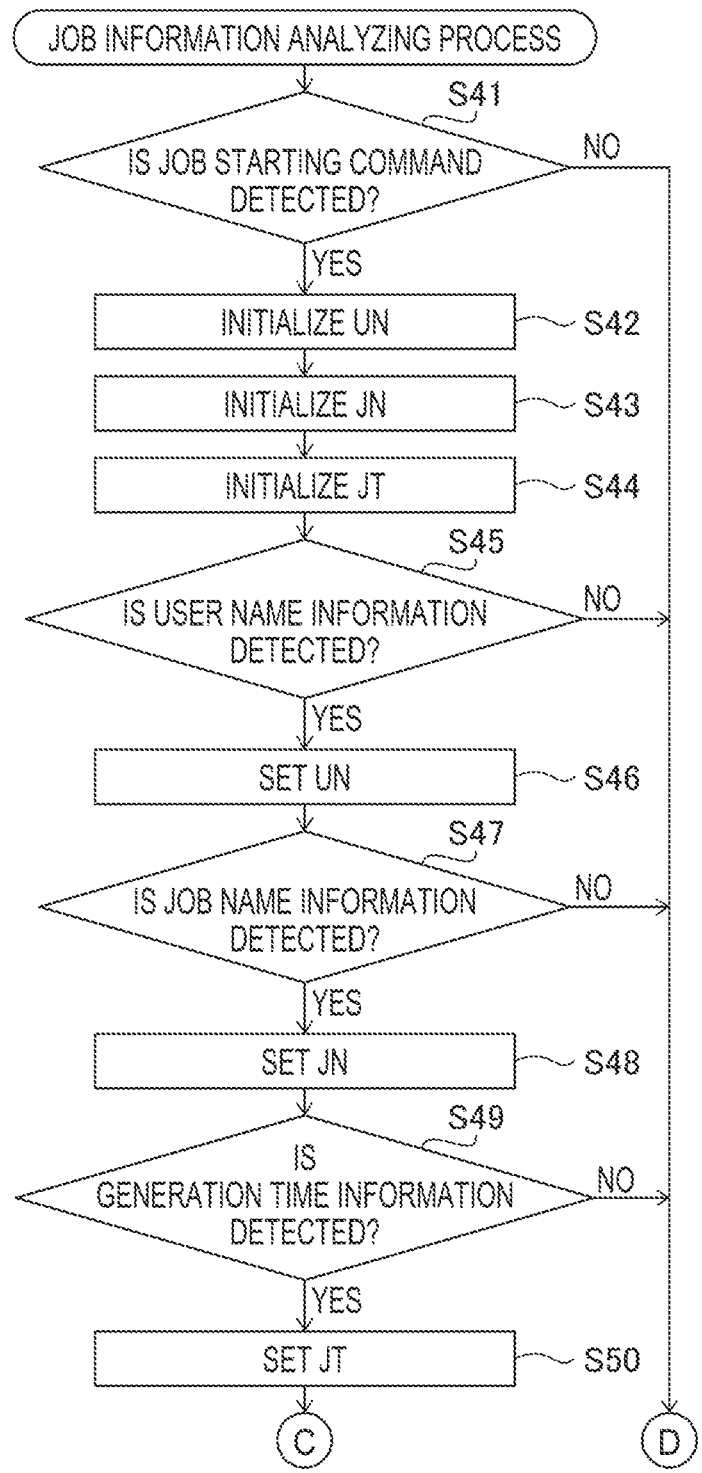
FIGS. 9A and 9B show a flowchart illustrating a job information analyzing process.
Figure 9B:
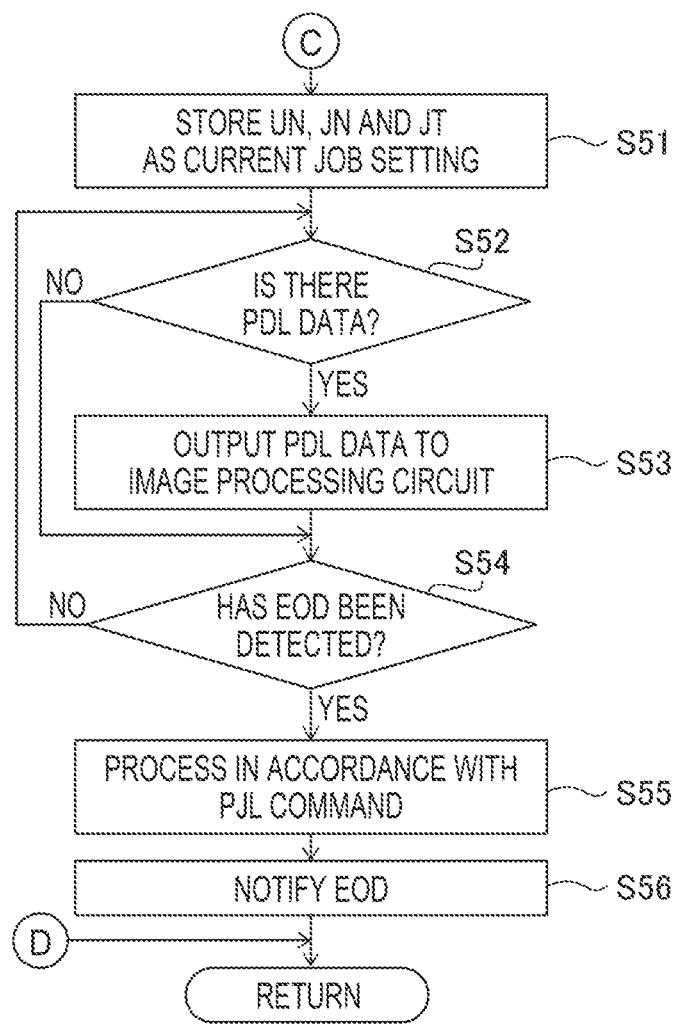

It is noted that the output of the PDL data to the image processing circuit 120 will be performed in S53 of a job information analyzing process, which will be described later with reference to FIGS. 9A and 9B.

The print queue is a memory and provided, for example, in the print engine 111. Therefore, each time the rasterized data for one page is generated, the image processing circuit 120 registers the rasterized data to the print queue in the print engine 111 via the engine IF 110. The print engine 111 is configured to read out the rasterized data at a particular timing when the rasterized data is registered to the print queue, and print out the same onto the sheet.

Figure 2C:
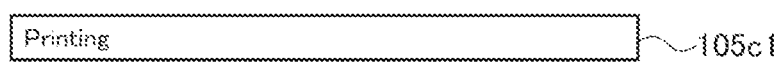

In S10, the CPU 101 displays a printing-in-process screen on the panel 105. FIG. 2C shows an example of the status area 105*c*1 included in the printing-in-process screen. That is, the printing-in-process screen is a screen that is formed by changing the status area 105*b*1 in the data reception-in-process screen 105*b* shown in FIG. 2B to the status area 105*c*1.

Returning to FIG. 7, in S11, the CPU 101 determines whether a printed page count display start notification is received. It is noted that the printed page count display start notification performed in S102 of an all-page count information generating process, which will be described later with reference to FIG. 13A. A timing at which the printed page count display start notification is made will also be described when the all-page count information generating process is described.

When it is determined that the MFP 100 has received the printed page count display start notification (S11: YES), the CPU 101 performs the page count display process (S13), and then returns the process to S1. It is noted that the page count display process will be described later with reference to FIG. 12.

When it is determined that the printed page count display start notification has not been received (S11: NO), the CPU 101 waits until an all-page-print completion notification is received (S12: NO). Upon receiving the all-page-print completion notification (S12: YES), the CPU 101 returns the process to S1. It is noted that the all-page-print completion notification is generated in S78 of the printed page count information generating process which will be described later with reference to FIG. 11.

Figure 13A:
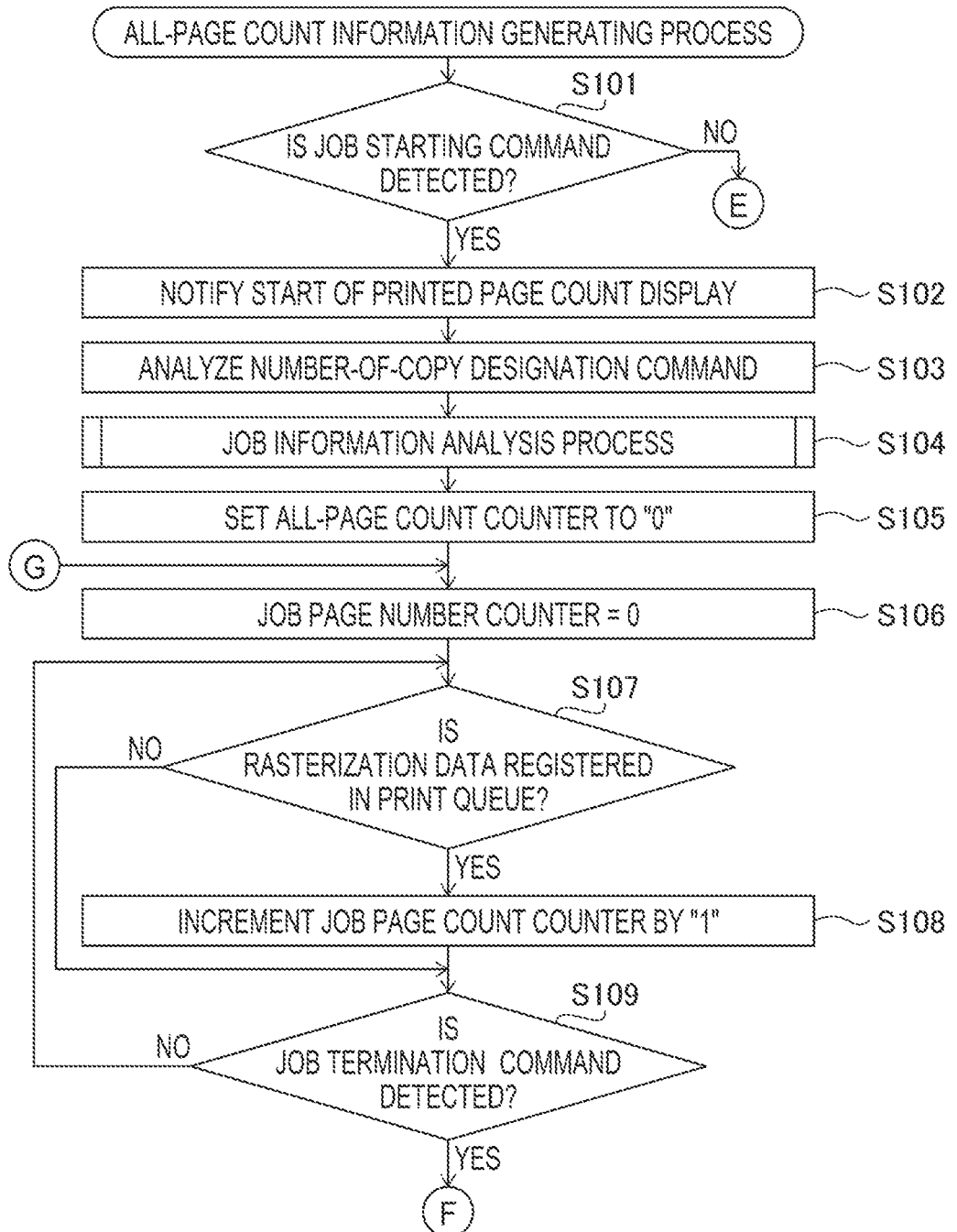
FIGS. 13A and 13B show a flowchart illustrating an all-page count information generating process.
Figure 13B:
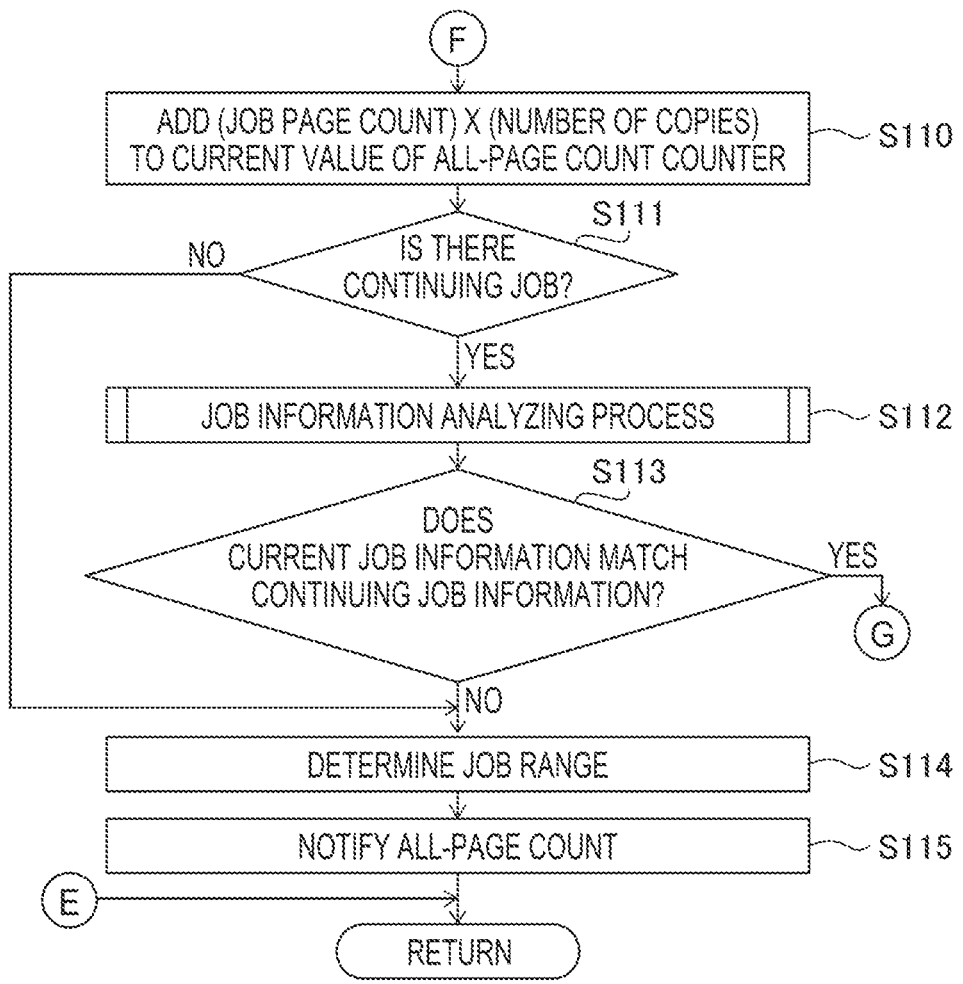

FIG. 13A and FIG. 13B show procedures of the all-page count information generating process. In the all-page count information generating process, information included in the print job is analyzed, and the all-page count of (i.e., the total number of) all the pages of the print data included in the print job is counted and notified.

When multiple print jobs are received and the multiple print jobs can be treated as a single print job, the CPU 101 calculates the sum of the number of pages of the print data contained in each of the multiple print jobs and notifies the sum as the all-page count of the multiple print jobs.

It is noted that the CPU 101 performs the all-page count information generating process and the main process (FIG. 7) in parallel and independently. Therefore, both the all-page count information generating process and the main process are performed all the time when the MFP 100 is in the power-on state.

In FIG. 13A, the CPU 101 firstly determines whether a job starting command is detected (S101). The job starting command is, for example, "@PJL JOB NAME=" which is described in line 210 of data 200. It is noted that the job starting command is not included in the data 300.

When it is determined that the job starting command is not detected (S101: NO), the CPU 101 terminates the all-page count information generating process. On the other hand, when it is determined that the job starting command is detected (S101: YES), the CPU 101 performs the display start notification of the number of printed pages (S102). In this way, since the display start notification of the number of printed pages is performed in response to the detection of the job starting command in the received data, the page count display process in S13 (FIG. 7) is started in response to the detection of the job starting command in the received data.

Next, the CPU 101 performs a number-of-copy designation command analysis (S103). FIG. 5 shows job configuration examples of print jobs output in response to one printing operation by the user. In FIG. 5, example No. 1 shows a job configuration when a multiple-copy printing (two copies in this example) is designated and printing in units of copies is set to ON. In this example, two print jobs having the same contents are generated, and the number-of-copy command is set to N/A (not available). That is, by performing the printing process based on the generated two print jobs, two copies are printed in units of copies. In the "Print Data" item in FIG. 5, one print job is indicated from a white down-pointing triangle mark to a black down-pointing triangle mark.

Example No. 2 in FIG. 5 shows a job configuration when the multiple-copy printing (two copies, in this example) is designated and printing in units of copies is set to ON, as in the example No. 1. However, in the example No. 2, one print job is generated and the number "2" is specified by the number-of-quantity command "@PJL SET QTY=". In other words, by repeating the generated print job twice to perform the printing process, two-copy printing and printing in units of copies are performed.

Further, example No. 3 in FIG. 5 shows a job configuration when the multiple-copy printing (two copies, in this example) is designated and the printing in units of copies is set to OFF. In this example, as in the example No. 2, one print job is generated and the number "2" is specified by the number-of-copy command "@PJL SET COPIES=". That is, two-copy printing is performed by repeating the generated print job twice for each page, thereby executing the two-copy printing.

Example No. 4 shows a job configuration when the single-copy printing is designated. In this example, one print job is generated for each page. In other words, three print jobs are generated to print three different pages.

Returning to FIG. 13A, in S103, when the CPU 101 applies, for example, an analysis of the number-of-copy designation command to the job configuration of the example No. 1, the CPU 101 obtains "N/A," that is, "1" as the number of copies. On the other hand, when the number-of-copy designation command analysis is applied to the job configuration of the example No. 2, the CPU 101 obtains "2" as the number of copies.

Next, the CPU 101 performs a job information analyzing process (S104). FIGS. 9A and 9B show detailed procedures of the job information analyzing process. First, in FIG. 9A, the CPU 101 determines whether the job starting command is detected (S41), as in S101. When it is determined that the job starting command is not detected (S41: NO), the CPU 101 terminates the job information analyzing process. When it is determined that the job starting command is detected (S41: YES), the CPU 101 initializes a variable UN which is for setting information indicating a user's name included in the print job subjected to the analysis (S42). Next, the CPU 101 initializes a variable JN which is for setting information indicating a job name included in the print job subjected to the analysis (S43). Further, the CPU 101 initializes a variable JT which is for setting information indicating a generated time of the job included in the print job subjected to the analysis (S44).

It is noted that the information indicating the user name indicates the name of the user who generated the print job. The information indicating the user name is used to identify the user who generated the print job when the MFP 100 is shared by multiple persons, or to identify the print job generated by the user who logged in to the secure print mode when the secure print mode is selected. The information indicating the job name indicates the name given to the print job. The information indicating the job name can be assigned by the user or may be assigned automatically by the application software that generated the print job.

In the case of automatic assignment, all the job names may be assigned automatically, or a sequential number may be added to a fixed name assigned by the user, for example. The information indicating the generation time of the job indicates the time when the application software generated the print job. The information indicating the job generation time is used when printing is instructed by multiple print jobs, and the print process is performed starting from the job with the earliest generation time, or when display of the print job history is instructed, and multiple print jobs are listed according to their generation time.

Next, the CPU 101 determines (S45) whether a user name has been detected from the input data, i.e., the data received in S4. When the input data is, for example, the data 200 of FIG. 4A, the CPU 101 determines whether the command "@PJL SET USERNAME=" has been detected. When it is determined that the user name is detected (S45: YES), the CPU 101 sets the user name specified by the command "@PJL SET USERNAME=", that is, "taro" in the data 200, to the variable UN (S46). Thereafter, the CPU 101 advances the process to S47. On the other hand, when it is determined that no user name is detected (S45: NO), the CPU 101 terminates the job information analysis process.

In S47, the CPU 101 determines whether a job name has been detected from the input data. When the input data is, for example, data 200, the CPU 101 determines whether the command "@PJL SET JOBNAME=" has been detected. When it is determined that the job name is detected (S47: YES), the CPU 101 sets the job name specified by the command "@PJL SET JOBNAME=", that is, "XXX" in the data 200, to the variable JN (S48). Thereafter, the process proceeds to S49. On the other hand, when it is determined that no job name was detected (S47: NO), the CPU 101 terminates the job information analysis process.

In S49, the CPU 101 determines whether the generation time is detected from the input data. When the input data is, for example, data 200, the CPU 101 determines whether the command "@PJL SET JOBTIME=" has been detected. When it is determined that the generation time was detected (S49: YES), the CPU 101 sets the generation time specified by the command "@PJL SET JOBTIME=", that is, in the data 200, "20190918091304" to the variable JT (S50), and then the process proceeds to S51. On the other hand, when it is determined that the generation time was not detected (S49: NO), the CPU 101 terminates the job information analysis process.

In S51, the CPU 101 stores each value of the variable UN, the variable JN, and the variable JT in memory, for example, in the RAM 103 described above, as the current job setting. Then, the CPU 101 determines whether there is PDL data in the input data (S52). When it is determined that there is PDL data (S52: YES), the CPU 101 outputs the PDL data to the above-mentioned image processing circuit 120 (S53), and then advances the process to S54. On the other hand, when it is determined that there is no PDL data (S52: NO), the CPU 101 skips S53 and advances the process to S54.

In S54, the CPU 101 determines whether the EOD has been detected. In the data 200 of FIG. 4A, as described above, the EOD is indicated by "<ESC>%-12345X." Therefore, in S54, the CPU 101 determines whether "<ESC>%-12345X" has been detected. When it is determined that the EOD was not detected (S54: NO), the CPU 101 returns the process to S52. On the other hand, when it is determined that the EOD is detected (S54: YES), the CPU 101 executes a process according to the PJL command (S55), performs the EOD notification (S56), and then terminates the job information analysis process. The EOD notification is used in S8 (FIG. 7) of the main process.

Returning to FIG. 13, the CPU 101 next sets the value of the all-page count counter (i.e., total number-of-page counter), which is, for example, a software counter provided in the RAM 103, to "0" in order to count the total number of pages (S105). Then, the CPU 101 sets the value of the job page number counter, which is, for example, a software counter provided in the RAM 103, to "0" in order to count the number of pages of the print data included in the print job (S106).

Next, the CPU 101 increments the job page count counter by "1" (S108) every time the rasterization data for one page is registered in the print queue (S107: YES). Then, the CPU 101 continues to increment the job page count counter every time the rasterization data is registered in the print queue until a job termination command is detected (S109: YES). The job termination command is, for example, "@PJL EOJ NAME=" included in the description line 220 in the data 200. When the CPU 101 detects the job termination command (S109: YES), the CPU 101 advances the process to S110. In this way, by executing the processes of S107 to S109, the CPU 101 can count the number of pages of the print data included in one print job using the job page count counter.

In S110, the CPU 101 updates the all-page count counter by adding the result of the multiplication of the value of the job page count counter×the number of copies to the current value of the all-page count counter. When the process proceeds to S110 for the first time after executing S105, the current value of the all-page count counter equals zero (0), and the value of the all-page count counter is equal to (the value of the job pages counter)×(the number of copies). When the input data is the data shown in the job configuration example No. 1 above, the number of copies equals 1. Therefore, in this case, the value of the all-page count counter is equal to the value of the job page count counter. On the other hand, when the input data is the data shown in the job configuration example No. 2, the number of copies equals 2, and in this case, the value of the total number of pages counter is equal to (the value of the number of job page count counter)×2.

Next, the CPU 101 determines whether there is a continuing job, that is, a print job that has been received continuously with the current job (S111). This judgment may be made based on whether or not the elapsed time since the reception of the current job has been completed has exceeded a particular time period. FIGS. 6A and 6B show an example of a case in which multiple print jobs are continuously received. FIG. 6A shows an example in which four jobs 1 to 4 are continuously received, and FIG. 6B shows an example in which three jobs 1 to 3 are continuously received. When it is determined that there is a continuing job (S111: YES), the CPU 101 performs the job information analysis process (S112) in the same manner as in S104. It is noted, however, the job information analysis process to be executed in S112 differs from the job information analysis process executed in S104 in that the print job to be analyzed is different. That is, in S104, the CPU 101 performs the job information analysis process for the current job, while in S112, the CPU 101 performs the job information analysis process for the print job that continues the current job. For example, in FIG. 5, it is assumed that the current job is Job1 and the continuation job is Job2. In this case, UN=taro, JN=XXX and JT=20200602110202 are stored as the current job setting by the execution of the job information analysis process in S105. Then, the same UN=taro, JN=XXX and JT=20200602110202 are stored as the continuing job setting by the execution of the job information analysis process in S112.

Next, the CPU 101 determines whether the information of the current job and the continuation job match (S113). In this S113, it is determined whether or not the continuation job can be treated as the same job as the current job. In other words, the CPU 101 determines that the continuing job can be handled as the same job as the current job when the information of the current job and the information of the continuing job are the same. When it is determined that the information of the current job and the information of the continuing job match (S113: YES), the CPU 101 returns the process to S106. On the other hand, when it is determined that the information of the current job and the information of the continuing job do not match (S113: NO), the CPU 101 advances the process to S114.

On the other hand, when it is determined that there is no continuing job (S111: NO), the CPU 101 skips S112 and S113, and then advances the process to S114.

When the plurality of received print jobs are jobs Job1 through Job4 shown in FIG. 6A, three pieces of information are included in each of the three jobs Job1-Job3, namely UN=taro, JN=XXX and JT=20200602110202 match. However, one of the three pieces of information, namely JT=20200602110305, included in the job Job4 is different from JT=20200602110202 included in the other three jobs Job1-Job3. Therefore, the CPU 101 makes a positive determination "YES" in S113 and handles the three jobs Job1 through Job3 as one print job, while makes a negative determination "NO" in S113 and handles the job Job4 as a print job different from the three jobs Job1 through Job3.

On the other hand, when the received plurality of print jobs are three jobs Job1 through Job3 shown in FIG. 6B, the three pieces of information included in each of the three jobs of Job1 through Job3 match similarly to the three jobs Job1 through Job3 shown in FIG. 6A. Therefore, the CPU 101 makes the affirmative decision "YES" in S113, and handles the three jobs of Job1 through Job3 as a single print job. However, since there is no job continuing to the job Job3, the CPU 101 makes a negative decision "NO" in S111 when the process in S110 for the job Job3, and skips the determining processes (S112 and S113) to determine whether the multiple jobs are to be handled as a single print job.

In S114, the CPU 101 determines the job range to be handled as a single print job. Then, the CPU 101 performs the all-page count notification (S115) and terminates the page count information generating process. The all-page count notification is used in the page count display process executed in S13 (FIG. 7).

In this embodiment, whether or not to treat multiple print jobs as a single print job is determined based on whether or not all three types of information contained in each print job, specifically, the user name, the job name, and the job generation time, are completely identical among the multiple print jobs. However, the condition may be modified such that the determination may be made based on whether or not two arbitrary type of information among the three are identical. Further, depending on the type of information, for example, regarding the job name, partial matches may be accepted instead of complete matches. This is because job names may be automatically numbered sequentially, as described above. In this embodiment, the same job name "XXX" is assigned to multiple print jobs, but some application software that generates print jobs may use sequentially numbered job names such as XXX-1, XXX-2, XXX-3, and so on. If an exact match is required in such a case, multiple print jobs cannot be treated as a single print job, even if they are capable of being treated as one print job. Furthermore, the type of information is not limited to three types, but can be, for example, four types or even two types.

Figure 11:
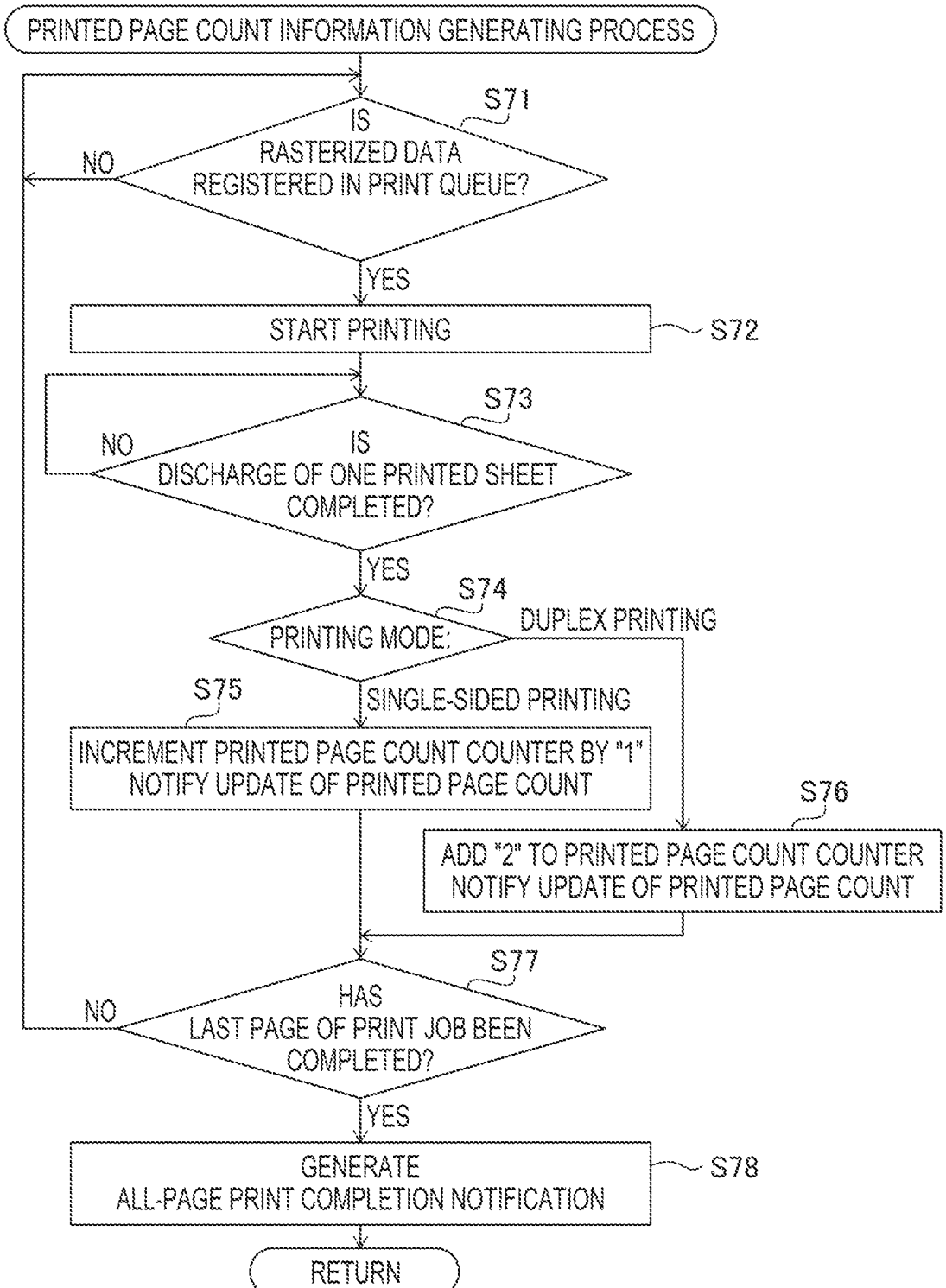
FIG. 11 is a flowchart illustrating a printed page count information generating process.

FIG. 11 shows the procedure of the page count information generating process. The page count information generating process counts the number of printed pages and notifies the user. It is noted that the CPU 101 executes the printed page count information generating process and the main process independently and in parallel. Therefore, the page count information generating process and the main process are always running while the power of the MFP 100 is turned on.

In FIG. 11, first, the CPU 101 waits until the rasterization data is registered in the print queue (S71: NO). When the rasterization data is registered in the print queue (S71: YES), the CPU 101 reads the rasterization data registered in the print queue and gives an instruction to start printing (S72) to the print engine 111 via the above-mentioned engine IF 110. The timing at which the affirmative decision "YES" is reached in S71 is the same as the timing at which the image processing circuit 120 registers the rasterization data based on the PDL data output in S53 (FIG. 9) of the job information analysis process into the print queue, and the timing at which the affirmative decision "YES" is reached in S9 (FIG. 7), and the timing at which a process of S64 in FIG. 10 described below is executed.

Next, the CPU 101 waits until the discharge of one printed sheet is completed (S73: NO), and when the discharge of one sheet is completed (S73: YES), the CPU 101 determines the currently selected printing mode (S74). When it is determined that the currently selected printing mode is the single-sided printing mode (S74: single-sided printing), the CPU 101 increments the number of printed pages counter, which is a software counter provided in the RAM 103, for example, to count the number of printed pages by "1," and the printed page count update notification is given (S75), and then the process proceeds to S77. The notification of the completion of the paper discharge of one sheet is made by the print engine 111 in this embodiment.

On the other hand, when it is determined that the currently selected printing mode is the duplex printing mode (S74: duplex printing), the CPU 101 increments the number of printed pages counter by "2," performs a printed page count update notification (S76), and proceeds the process to S77. The printed page count update notification made in S75 and S76 is a notification indicating that the value of the printed page count counter has been updated, and is used in S84 of the page count display process (FIG. 12) described below.

In S77, the CPU 101 determines whether the printing of the last page of the print job has been completed. When it is determined that the printing of the final page of the print job has been completed (S77: YES), the CPU 101 performs the all-page-print completion notification (S78) and then terminates the printed page count information generating process. On the other hand, when it is determined that the printing of the last page of the print job has not been completed (S77: NO), the CPU 101 returns the process to S71. The all-page printing completion notification is used in a page number display process (S86) described below.

Figure 12:
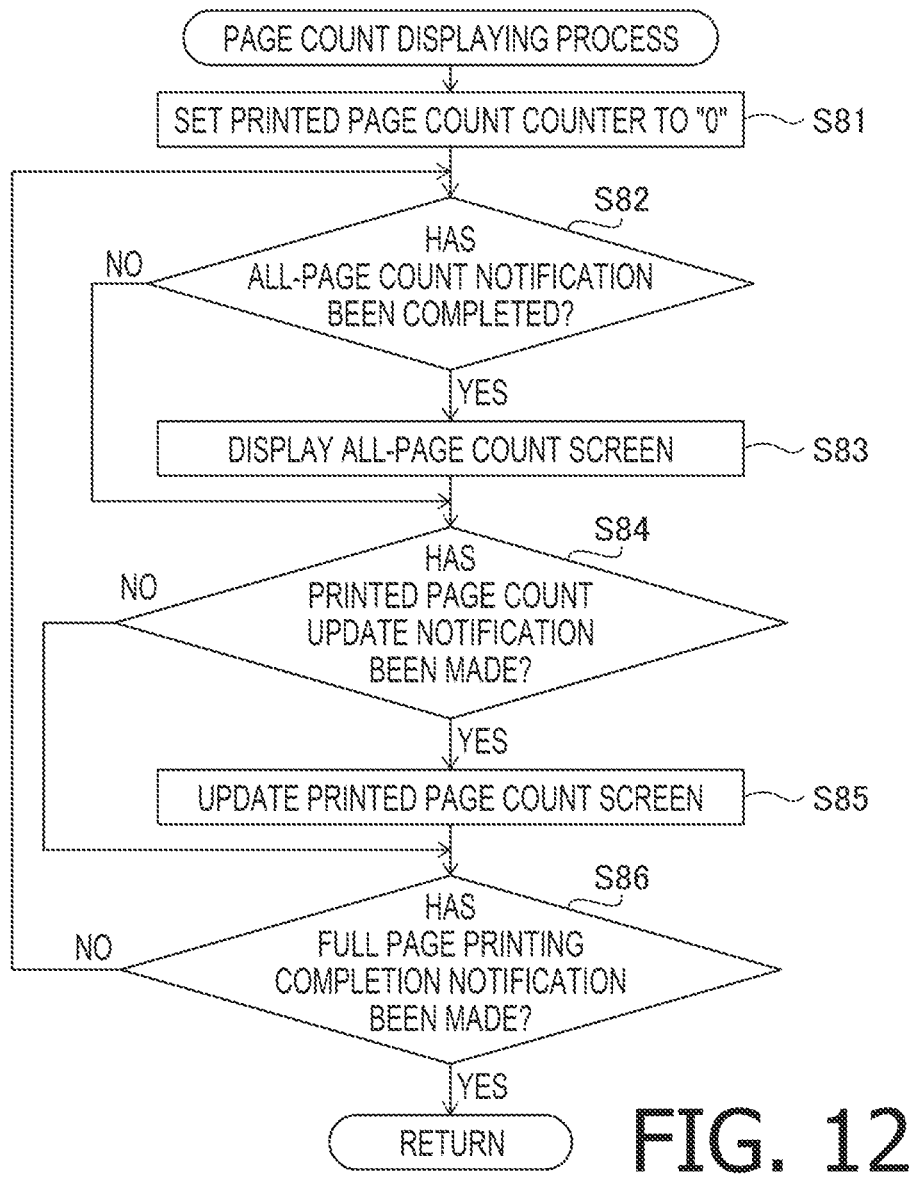
FIG. 12 is a flowchart illustrating a page count displaying process.

FIG. 12 shows the detailed procedure of the page count display process performed in S13 (FIG. 7). In FIG. 12, first, the CPU 101 sets the printed page count counter to "0" (S81).

Next, the CPU 101 determines whether an all-page count notification has been made (S82). The all-page count notification is made in S115 of the page count information generating process of FIG. 13. In other words, the all-page count notification is made when the counting of all pages of print data contained in one print job (including multiple print jobs that can be handled as one print job) is completed.

When it is determined that the all-page count notification has not been made (S82: NO), the CPU 101 determines whether or not the printed page count update notification has been made (S84). The printed page count update notification is made in S75 or S76 of the printed page count information generating process of FIG. 11. In other words, the printed page count update notification is made every time a sheet of printed paper has been discharged.

Figure 2D:
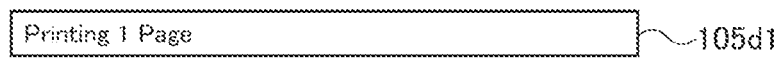

When it is determined that the printed page count update notification has been made (S84: YES), the CPU 101 updates the printed page count screen (S85) and then advances the process to S86. When the process proceeds to S85, there are two cases: one is that the above S83 has never been executed in the past, and the other is that the above S83 has been executed once in the past. FIG. 2D shows an example of the status area 105d1 included in the first page count display screen displayed on the panel 105 when the above S83 has never been executed in the past. In other words, the first page count display screen is a screen formed by changing the status area 105b1 in the screen 105b receiving data in FIG. 2B to the status area 105d1. The display of the status area 105d1 differs from the display of the status area 105c1 in that the number of printed pages (1 page in the example shown in the figure) is added. The display of the printed page count is updated based on the value of the printed page count counter.

When it is determined that the printed page count update notification has not been made (S84: NO), the CPU 101 advances the process to S86. In S86, the CPU 101 determines whether or not the all-page printing completion notification has been made. In this determination, when it is determined that the all-page printing completion notification has been made (S86: YES), the CPU 101 terminates the page number display process. On the other hand, when it is determined that the all-page printing completion notification has not been made (S86: NO), the CPU 101 returns the process to S82 above.

Figure 2E:

On the other hand, when it is determined that the all-page count notification has been made (S82: YES), the CPU 101 displays the all-page count screen (S83) and then proceeds the process to S84. FIG. 2E shows an example of the status area 105e1 included in the second page count display screen displayed on the panel 105. In other words, the second page count display screen is a screen formed by changing the status area 105b1 in the data receiving screen 105b of FIG. 2B to the status area 105e1. The display of the status area 105e1 differs from the display of the status area 105c1 in that the number of printed pages/number of all pages (15/30 page in the example shown in the figure) is added. The display of the all-page count is based on the value of the all-page count counter.

Once the process of S83 is executed, the display of the number of printed pages/number of all pages is updated in S85 such that only the printed page count is updated.

In this way, when the MFP 100 starts receiving data with a definite job scope, such as the data 200 in a state where the standby screen 105a (FIG. 2A) is displayed on the panel 105, the screen on the panel 105 transitions from the standby screen 105a to the data reception-in-progress screen 105b (FIG. 2B). Next, when the rasterized data is registered in the print queue, the screen on the panel 105 transitions from the data reception-in-progress screen 105b to the printing-in-progress screen that includes the status area 105c1 (FIG. 2C). When one printed sheet has been discharged, the screen on the panel 105 transitions from the printing-in-progress screen to the first page count display screen including the status area 105d1.

Next, when the counting of the total number of pages of print data contained in one print job (including multiple print jobs that can be handled as one print job) is completed, the screen on the panel 105 transitions from the first page count display screen to the second page count display screen including the status area 105e1. Further, when the printing of all the pages of the print data included in one print job is completed, the screen on the panel 105 transitions from the all-page count display screen to the standby screen 105a.

In this way, the MFP 100 makes it possible to display the number of pages being printed even when printing a single number of copies. In addition, when the counting of all pages of the print data included in one print job is completed, the number of all pages is displayed in addition to the number of pages already printed. Accordingly, the user can know a timing when the printing is finished.

On the other hand, when the MFP 100 starts receiving data of which job scope is indefinite, such as the data 300 in a state where the standby screen 105a (FIG. 2A) is displayed on the panel 105, the screen on the panel 105 transitions from the standby screen 105a to the data reception-in-progress screen 105b (FIG. 2B). Next, when the rasterized data is registered in the print queue, the screen on the panel 105 transitions from the data reception-in-progress screen 105b to the printing-in-progress screen that includes the status area 105c1 (FIG. 2C). Then, the printing-in-progress screen is continuously displayed until the printing of all the pages of the print data included in one print job is completed. When the printing of all the pages is completed, the screen on the panel 105 transitions from the printing-in-progress screen to the standby screen 105a. When data with an indefinite job scope is received in this way, neither the first page number display screen nor the second page number display screen is displayed since it is not possible to perform an effective analysis of the information contained in the data.

Figure 8A:
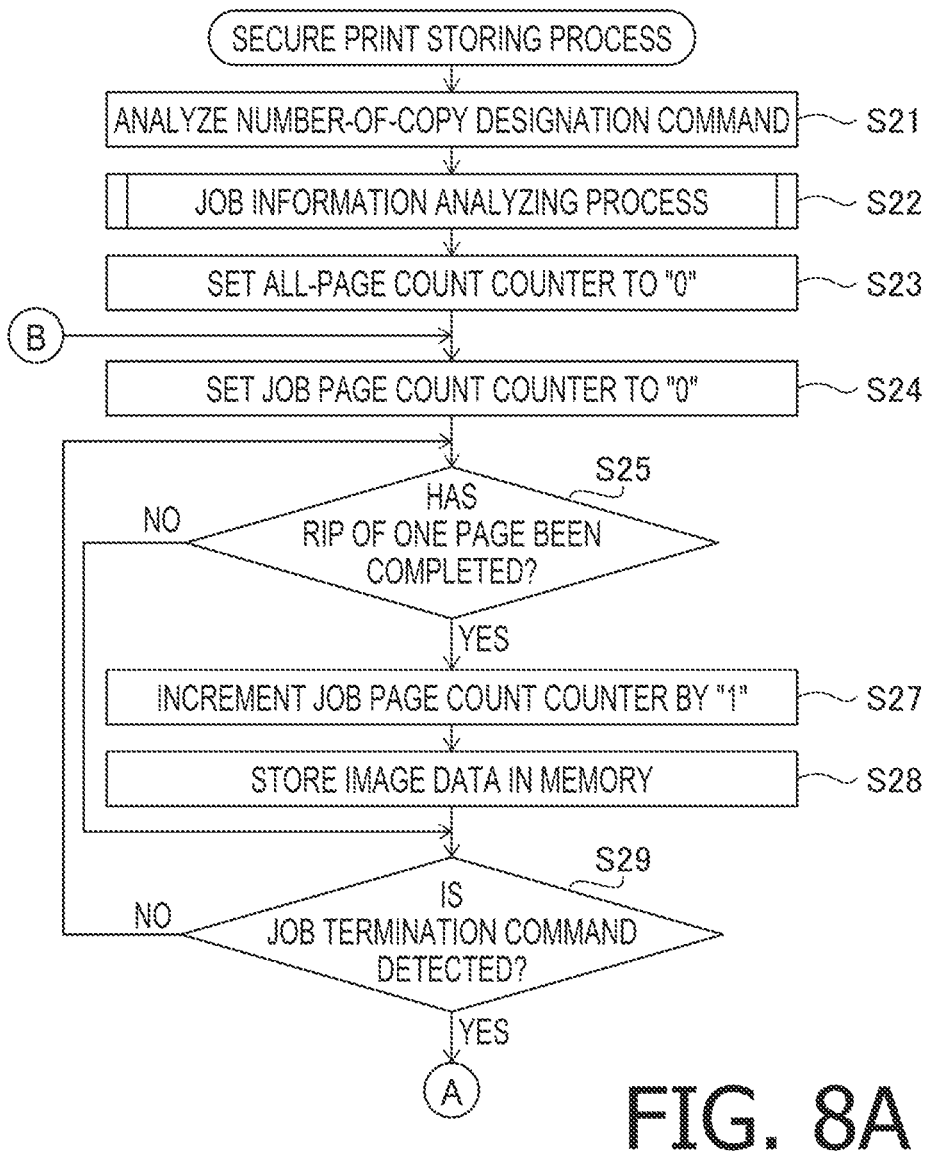
FIGS. 8A and 8B show a flowchart illustrating a secure print storing process.
Figure 8B:
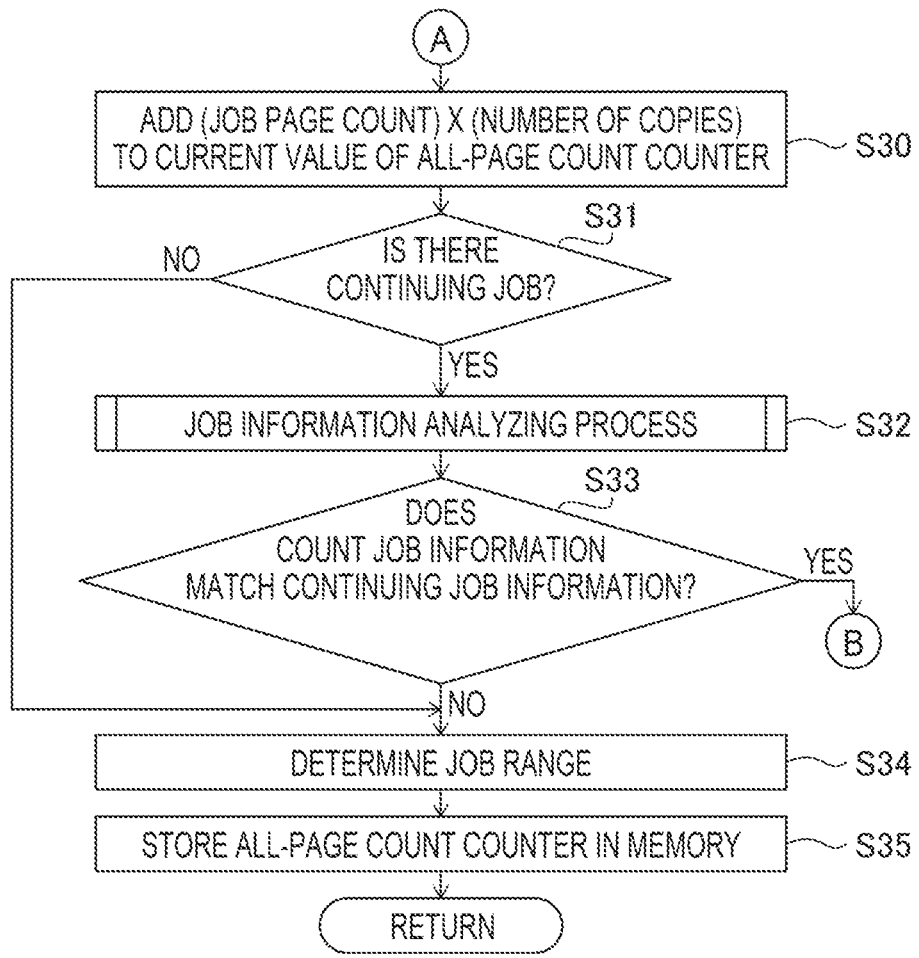

FIGS. 8A and 8B show the detailed procedure of the secure print storing process executed in S7 of FIG. 7. The secure print storing process differs from the page count information generating process in FIG. 13A in that S101 and S102 are deleted, S25, S27, and S28 are inserted in place of S107 and S108, and S35 is inserted in place of S115. In other words, S21, S22, S23 and S24 of FIG. 8A are the same as S103, S104, S105 and S106 of FIG. 13A, respectively. Further, S29-S35 of FIGS. 8A and 8B are the same as S109-S115 of FIGS. 13A and 13B, respectively. Therefore, the description of the process same as the page count information generating process in the secure print storing process is omitted.

In S25 of FIG. 8A, the CPU 101 determines whether or not a RIP of one page has been completed. When it is determined that the RIP of one page has been completed (S25: YES), the CPU 101 increments the job page count counter by "1" (S27) and stores the rasterized data for one page, which is generated as the RIP is completed, in the memory, for example, the RAM 103 (S28). It is noted that the term "RIP" is an abbreviation for a raster image processor.

Then, at the end of the secure print storing process (S35), the CPU 101 stores the value of the all-page count counter to memory.

When the secure print storing process is executed in this way, when the multiple print jobs can be handled as a single print job, all the print data contained in each of the multiple print jobs is converted to rasterized data and stored in the memory, and the total number of pages is obtained and stored in association with all the rasterized data.

Figure 10:
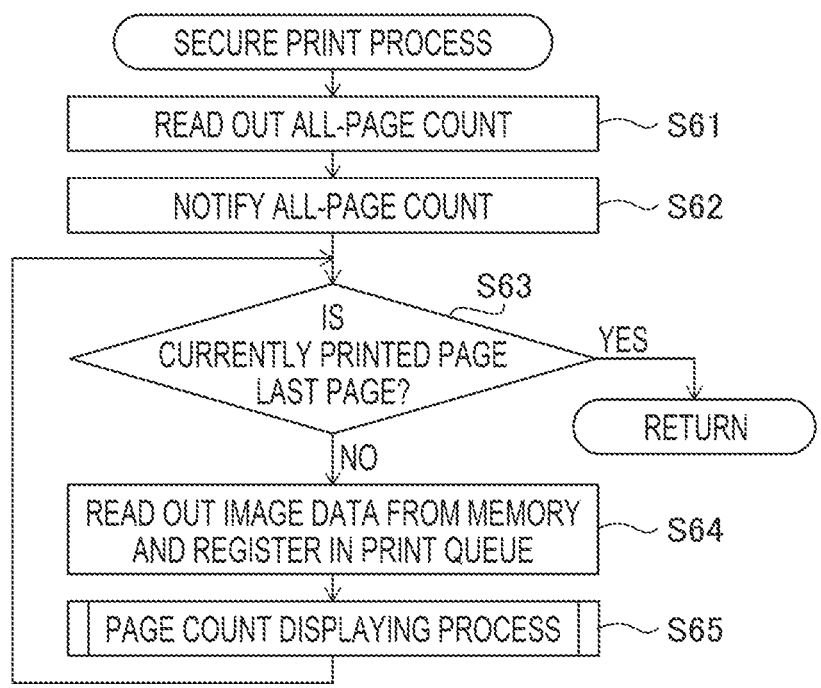
FIG. 10 is a flowchart illustrating a secure print process.

FIG. 10 shows the detailed procedure of the secure print process executed in S3 of FIG. 7. In parallel with the secure print process, the printed page count information generating process shown in FIG. 11, which targets the image data registered in the print queue in the process of S64 described below, is executed. In FIG. 10, the CPU 101 reads the total number of pages (i.e., all-page count) from the memory (S61). Since the secure print process is executed after the secure print storage process is executed, the image data to be printed, i.e., the rasterized data and the total number of pages thereof, are already stored in the memory when the secure print process is executed.

Next, the CPU 101 performs the all-page count notification (S62) in the same manner as S115 (FIG. 13), and then advances the process to S63. In S63, the CPU 101 determines whether or not the currently printed page is the last page. When it is determined that the current printing page is the last page (S63: YES), the CPU 101 terminates the secure print process. On the other hand, when it is determined that the current printed page is not the last page (S63: NO), the CPU 101 advances the process to S64.

In S64, the CPU 101 reads the image data from the memory and registers the same in the print queue. Next, the CPU 101 executes the page count displaying process of FIG. 12 (S65), and then returns the process to S63.

Figure 3A:
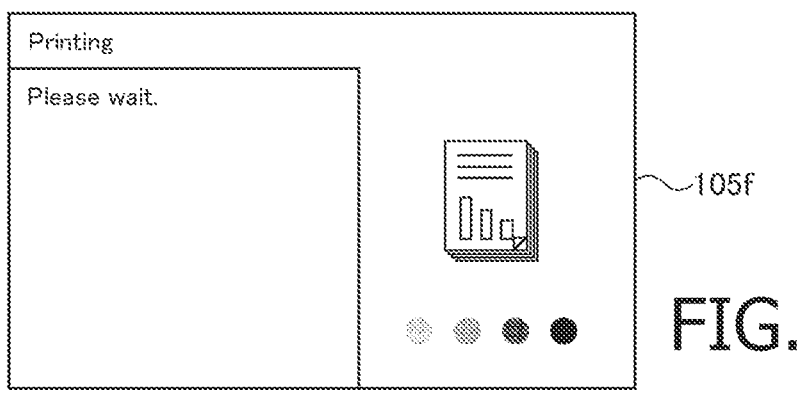
FIGS. 3A and 3B show an example of the transition of a display on the panel regarding a secure print.
Figure 3B:
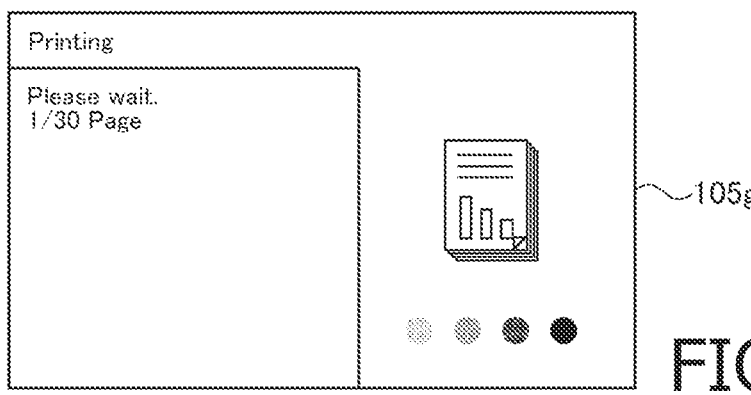

FIGS. 3A and 3B show an example of the screen transition on the panel 105 during the execution of the secure print process. When the execution of the secure print process is instructed, the screen on the panel 105 transitions from the standby screen 105a (FIG. 2A) to the printing-in-progress screen 105f in FIG. 3A. When the discharge of one printed sheet is completed, the screen on the panel 105 transitions from the printing-in-progress screen 105f to the page count display screen 105g. In the page count display screen 105g, an image of the number of printed pages/total number of pages as shown in the status area 105e1 in FIG. 2E is displayed from the time when the discharge of one sheet is completed. This is because when the secure print process is started, the secure print storing process has already been executed, as described above, so that the image data to be printed and the total number of pages thereof are already stored in the memory and are in a known state.

In the secure print process according to the present embodiment, it is described that an example of secure print is performed for one print job. However, when multiple print jobs corresponding to the user name who has selected the secure print mode are stored in the memory, the multiple print jobs are handled as a single print job. The number of all pages may be counted by adding the number of pages of the print data contained in each of the multiple print jobs, and the number of pages may be displayed from one page to all pages on the page number display screen 105g of FIG. 3B.

As described above, the MFP 100 according to the present embodiment is provided with a network IF 108 and a CPU

101. The CPU 101 is configured to, when receiving a plurality of print jobs via the network IF 108, analyze the information contained in each of the plurality of print jobs and treat the plurality of print jobs as a single print job according to the analyzed information.

Here, an expression of "analyzing the information contained in the print job" is a concept that includes extracting the information contained in the print job by analyzing the print job, comparing the plurality of information contained in the print job by analyzing the print job, and so on.

Thus, in the MFP 100 of this embodiment, when multiple received print jobs are jobs that can be handled as a single print job, they can be handled as a single print job. Incidentally, in this embodiment, the MFP 100 is an example of an "image processing apparatus," the network IF 108 is an example of a "communication interface" and the CPU 101 is an example of a "controller."

Aspects of the present disclosures are not necessarily limited to the above embodiment, and various modifications can be made without departing from aspects thereof. For example, in the above embodiment, the MFP 100 is used as an example of an image forming device. However, the image forming device is not necessarily be limited to the MFP 100 but can be a stand-alone printer, scanner or a copier. Further, in the above embodiment, a single CPU 101 is used as an example of a controller, but aspects of the present disclosures are not necessarily be limited to such a configuration. That is, a plurality of CPUs may be used, or a CPU comprising a plurality of cores may be included in the controller. The controller may also have a CPU and a dedicated circuit. In such a configuration, as the dedicated circuit, ASIC and FPGAs may be used.

Figure 14:
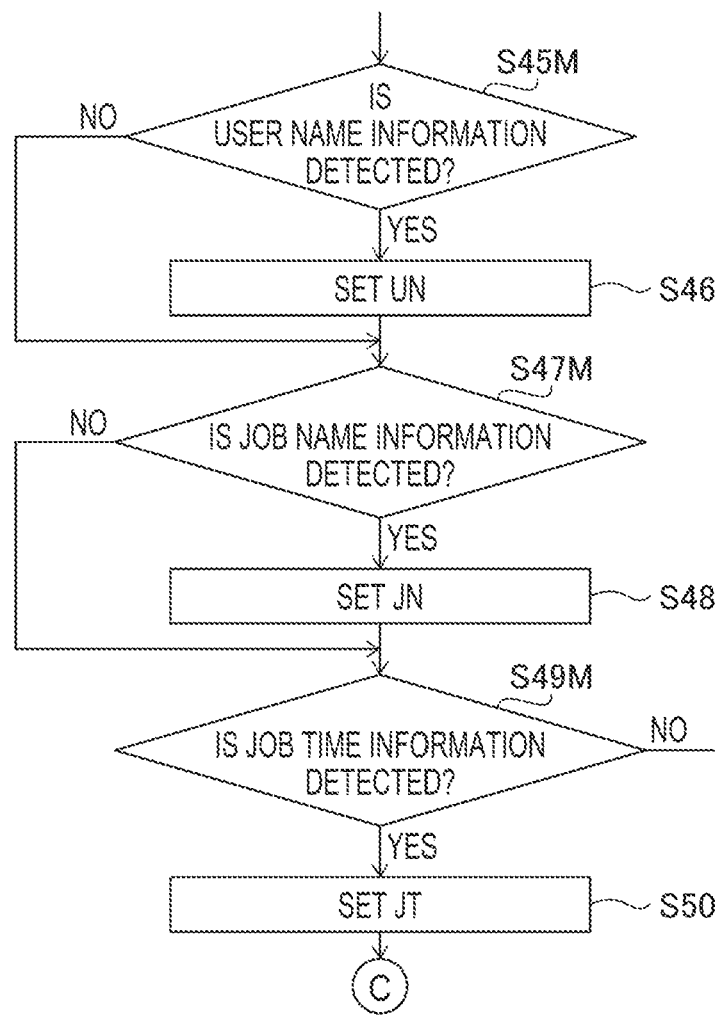
FIG. 14 shows a modified portion for replacing a corresponding portion of the flowchart shown in FIG. 9A.

In the above-described embodiment, only when the UN, JN and JT of all the multiple jobs match, the multiple print jobs are handled as a single print job. Such a configuration may be modified such that the multiple print jobs may be handled as a single print job when at least one of the UN, JN and JT of all the multiple jobs match. Such a modification is illustrated in FIG. 14. FIG. 14 shows a part of FIG. 9A (S45-S50) which replaces the same portion of FIG. 9A.

In FIG. 14, when it is determined that the user name is detected (S45M: YES), the CPU 101 sets the user name specified by the command "@PJL SET USERNAME=" (S46), and the CPU 101 advances the process to S47M. On the other hand, when it is determined that no user name is detected (S45M: NO), the CPU 101 skips S46 and proceeds to S47M. When it is determined that the job name is detected (S47M: YES), the CPU 101 sets the job name specified by the command "@PJL SET JOBNAME=" (S48), and proceeds to S49M. On the other hand, when it is determined that no job name was detected (S47: NO), the CPU 101 skips S48 and proceeds to S49M. According to such a modification, the CPU 101 stores the detected one(s) of the UN, JN and JT in the memory as the current job setting in S51. Further, in S33 of FIG. 8B, the CPU 101 determines that the information of the multiple jobs match each other when at least one of the UN, JN and JT is commonly included the information of the multiple print jobs and the commonly included one of the UN, JN and JT in the information of each of the multiple print jobs is the same.

It is further noted that, according to the modification shown in FIG. 14, at least one of the UN, JN and JT of the multiple print jobs match, the multiple print jobs are handled as a single print job. Although not shown in a drawing, such a configuration may further be modified to realize a configuration in which at least two of the UN, JN and JT of the multiple print jobs match, the multiple print jobs are handled as a single print job.

What is claimed is:

1. An image processing apparatus comprising:
a communication interface;
a controller; and
a display,
wherein the controller is configured to:
   receive a print job via the communication interface; and
   display a progress screen indicating a progress of printing based on a print data included in a print job, and
wherein, when the controller receives multiple print jobs that are different from each other via the communication interface, the controller is configured to:
analyze information included in each of the multiple print jobs;
determine whether the multiple print job are able to be handled as a single print job based on the analyzed information included in each of the multiple print jobs;
in a case where determining that the multiple print jobs are able to be handled as the single print job, display, on the display, the progress screen by displaying the printing progress of the multiple print jobs as the printing progress of the single print job including a first all page number image, the first all page number image being an image indicating a total number of pages to be printed obtained by adding all number of pages of print data included in the multiple print jobs, the total number of pages indicated by the first all page number image being determined in accordance with the analyzed information included in all of the multiple print jobs, and in a case where determining that the multiple print jobs are able to be handled as respective print jobs, display, on the display, the progress screen of one of the print jobs including a second all page number image, the second all page number image being an image indicating a total number of pages to be printed based on print data included in the one of the print jobs, the total number of pages indicated by the second all page number image being determined in accordance with the analyzed information included in the one of the print jobs, the controller being configured to display a progress screen of a next print job among the print jobs after displaying the progress screen of one of the print jobs, the progress screen of the next print job including a third all page number image indicating a total number of pages of the next print job,
wherein the progress screen includes a status area and an icon display area, the icon display area being configured to display an icon, the status area being configured to display a text indicating the progress,
wherein, when the controller receives the multiple print jobs while displaying a standby screen on the display, the controller is configured to display a text indicating the multiple print jobs are being received in the status area of the progress screen and display an icon corresponding to an image processing in the standby screen,
wherein, when processing of the multiple print jobs proceeds to printing, the controller is configured to update the progress screen to display a text indicating that printing of the multiple print jobs is in progress;
in a case where determining that the multiple print jobs are able to be handled as the single print job, the controller is configured to, according to progress of the printing, update the progress screen to include a text indicating a number of pages that the processing has proceeded to printing and not indicating the first all page number until the first all page number is determined, and update the progress screen to include a text indicating how many pages of the first all page number have progressed to printing after the first all page number is determined, the first all page number being determined by analyzing all of the multiple print job, the first all page number being sum of a number of pages to be printed by print data included in each of the multiple print jobs; and in a case where determining that the multiple print jobs are able to be handled as respective print jobs, the controller is configured to, according to progress of the printing, update the progress screen to include a text indicating a number of pages that the processing has proceeded to printing and not indicating the second all page number until the second all page number of the one of the respective print jobs is determined, and update the progress screen to include a text indicating how many pages of the second all page number have progressed to printing after the second all page number of the one of the respective print jobs is determined, the second all page number being determined by analyzing one of the respective print jobs, the second all page number being sum of a number of pages to be printed by print data included in the one of the respective print jobs, in a case where printing of one of the respective print jobs is completed, the controller being configured to, for a next one of the respective print jobs, according to progress of the printing, update the progress screen to include a text indicating a number of pages that the processing has proceeded to printing and not indicating the second all page number until the second all page number of the next one of the respective print jobs is determined, and update the progress screen to include a text indicating how many pages of the second all page number have progressed to printing after the second all page number of the next one of the respective print jobs is determined.

2. The image processing apparatus according to claim 1, wherein the information includes information regarding a user name that identifies a user who generated each of the multiple print jobs, and wherein, when the user names of the multiple print jobs are identical, the controller is configured to handle the multiple print jobs as a single print job.

3. The image processing apparatus according to claim 1, wherein the information includes information regarding a job name of each of the multiple print jobs, and wherein, when the job names of the multiple print jobs are identical, the controller is configured to handle the multiple print jobs as a single print job.

4. The image processing apparatus according to claim 1, wherein the information includes information regarding a job time indicating a time at which each of the multiple print jobs was generated, and wherein, when the job times of the multiple print jobs are identical, the controller is configured to handle the multiple print jobs as a single print job.

5. The image processing apparatus according to claim 1, wherein the information includes more than one piece of information regarding a user name identifying a user who generated each of the multiple print jobs, a job name of each of the multiple print jobs, and a job time at which each of the multiple print jobs was generated, and wherein, when the more than one piece of information of the multiple print jobs are identical, the controller is configured to handle the multiple print jobs as a single print job.

6. The image processing apparatus according to claim 5, wherein the controller is configured to receive the multiple print jobs, via the communication interface, from an information processing apparatus in which an application software and a printer driver are installed, wherein each of the multiple print jobs is generated in accordance with a printing procedure using the printer driver to print content data generated as the information processing apparatus executes the application software, wherein each of the multiple print jobs is configured to include, at a time of being generated:

information of the user name indicating a user logged in to the information processing apparatus;

information of the job name including a data name of the content data generated by the application software; and information of the job time at which each of the multiple print jobs was generated, and wherein the controller is configured to analyze two or more types of the information among the information regarding the user name, the information regarding the job name, and the information regarding the job time.

7. The image processing apparatus according to claim 1, wherein the progress of printing includes displaying a page count image indicating the progress of printing based on the print data included in the print job by updating a number of pages as each page is printed.

8. The image processing apparatus according to claim 7, further comprising a memory, and wherein, in a state where an accumulation print mode, in which received print jobs are accumulated in the memory and printing is performed by reading out the accumulated print jobs, is selected, when multiple print jobs generated by a user who selects the accumulation print mode are accumulated in the memory, the controller is configured to handle the multiple print jobs as a single print job.

9. The image processing apparatus according to claim 1, wherein the icon display area is configured to display an icon corresponding to transition to a different image processing other than the print job in progress, wherein, when the controller receives the multiple print jobs while displaying the standby screen on the display, the controller is configured to display the progress screen including the icon corresponding to transition to the different image processing other than the print job in progress, wherein, when processing of the multiple print jobs proceeds to printing, the controller is configured to update the progress screen to display a text indicating printing of the multiple print jobs is in progress while displaying, in the progress screen, the icon corresponding to transition to the different image processing other than the print job in progress, wherein, in response to the icon corresponding to transition to the different image processing other than the print job in progress being operated while the icon is displayed in the icon display area, the controller is configured to change the progress screen to a screen for the image processing corresponding to the operated icon and perform the image processing corresponding to the operated icon by interrupting a print job being processed.

10. The image processing apparatus according to claim 9,
wherein, when the controller receives the multiple print jobs while displaying the standby screen on the display, the controller is configured to display an icon, which is different from an icon displayed on the icon display area of the progress screen, corresponding to an image processing in the standby screen, wherein an icon, which is different from an icon displayed on the icon display area of the progress screen, corresponding to the image processing in the standby screen includes an icon corresponding to an accumulation print, wherein, in response to the icon corresponding to the accumulation print being operated when the standby screen is displayed, the controller is configured to process an accumulation print job, the accumulation print job being a print job accumulated in a memory of the image processing apparatus, in a case where multiple accumulation print jobs is handled as a single print job, the controller being configured to, according to progress of printing of the accumulation print job, update the progress screen to include a text indicating how many pages of the first all page number have progressed to printing the first all page number being determined according to analyzing all of the multiple accumulation print jobs, he first all page number being sum of a number of pages to be printed by print data included in each of the multiple accumulation print jobs, wherein, in a case where multiple accumulation print jobs is handled as handled as respective accumulation print jobs, the controller is configured to, according to progress of printing of the accumulation print job, update the progress screen to include, in the status area, a text indicating how many pages of the second all page number of one of the respective accumulation print jobs have progressed to printing, the second all page number being determined by analyzing one of the respective accumulation print jobs, the second all page number being sum of a number of pages to be printed by print data included in the one of the respective accumulation print jobs, and wherein, in a case where printing of one of the respective accumulation print jobs is completed, the controller being configured to, for a next one of the respective accumulation print jobs, according to progress of the printing, update the progress screen to include a text indicating how many pages of the second all page number of the next one of the respective accumulation print jobs have progressed to printing.

11. The image processing apparatus according to claim 9, wherein the different image processing other than the print job in progress is as least one of facsimile transmitting, copying and scanning.

12. The image processing apparatus according to claim 1, wherein, when the controller receives the multiple print jobs while displaying the standby screen on the display, the controller is configured to display an icon, which is different from an icon displayed on the icon display area of the progress screen, corresponding to an image processing in the standby screen, wherein an icon, which is different from an icon displayed on the icon display area of the progress screen, corresponding to the image processing in the standby screen includes an icon corresponding to an accumulation print, wherein, in response to the icon corresponding to the accumulation print being operated when the standby screen is displayed, the controller is configured to process an accumulation print job, the accumulation print job being a print job accumulated in a memory of the image processing apparatus, in a case where multiple accumulation print jobs is handled as a single print job, the controller being configured to, according to progress of printing of the accumulation print job, update the progress screen to include a text indicating how many pages of the first all page number have progressed to printing the first all page number being determined according to analyzing all of the multiple accumulation print jobs, he first all page number being sum of a number of pages to be printed by print data included in each of the multiple accumulation print jobs, wherein, in a case where multiple accumulation print jobs is handled as handled as respective accumulation print jobs, the controller is configured to, according to progress of printing of the accumulation print job, update the progress screen to include, in the status area, a text indicating how many pages of the second all page number of one of the respective accumulation print jobs have progressed to printing, the second all page number being determined by analyzing one of the respective accumulation print jobs, the second all page number being sum of a number of pages to be printed by print data included in the one of the respective accumulation print jobs, and wherein, in a case where printing of one of the respective accumulation print jobs is completed, the controller being configured to, for a next one of the respective accumulation print jobs, according to progress of the printing, update the progress screen to include a text indicating how many pages of the second all page number of the next one of the respective accumulation print jobs have progressed to printing.

13. The image processing apparatus according to claim 12, wherein, in a case where the controller receives multiple accumulation print jobs subject to an accumulation print job via the communication interface, the controller is configured to analyze information included in the multiple accumulation print jobs, in a case where the accumulation multiple print jobs are handled as a single print job, in response to analyzing all of the multiple accumulation print jobs, the controller is configured to determine the first all page number and store the first all page number in a memory of the image processing apparatus, in response to the icon corresponding to the accumulation print being operated, in a case where the accumulation multiple print jobs are handled as a single print job when processing the accumulation multiple print jobs, the controller is configured to obtain the first all page number of the accumulation multiple print jobs from the memory, the controller is configured to, according to progress of printing of the accumulation print job, update the progress screen to include a text indicating how many pages of the first all page number have progressed to printing based on the obtained first all page number.

14. A non-transitory computer-readable recording medium for an image processing apparatus having a communication interface, a controller and a display, the controller being configured to receive a print job via the communication interface and display a progress screen indicating a progress of printing based on a print data included in a print job, the recording medium containing computer-readable instructions which cause, when executed by the controller, the image processing apparatus to perform:

analyzing, when the controller receives multiple print jobs that are different from each other via the communication interface, information included in each of the multiple print jobs;

determining whether the multiple print job are able to be handled as a single print job based on the analyzed information included in each of the multiple print jobs;

in a case where determining that the multiple print jobs are able to be handled as the single print job, displaying, on the display, the progress screen by displaying the printing progress of the multiple print jobs as the printing progress of the single print job including first all page number image, the first all page number image being an image indicating a total number of pages to be printed obtained by adding all number of pages of print data included in the multiple print jobs, the total number of pages indicated by the first all page number image being determined in accordance with analyzing of information included in all of the multiple print jobs, in a case where determining that the multiple print jobs are able to be handled as respective print jobs, displaying, on the display, the progress screen of one of the print jobs including second all page number image, the second all page number image being an image indicating a total number of pages to be printed based on print data included in the one of the print jobs, the total number of pages indicated by the second all page number image being determined in accordance with analyzing of information included in one of the print jobs, the controller being configured to display a progress screen of a next print job among the print jobs after displaying the progress screen of one of the print jobs, the progress screen of the next print job including the second all page number image indicating a total number of pages of the next print job, wherein the progress screen includes a status area and an icon display area, the icon display area being configured to display an icon, the status area being configured to display a text indicating the progress, wherein, when the controller receives the multiple print jobs while displaying a standby screen on the display, the controller is configured to display a text indicating the multiple print jobs are being received in the status area of the progress screen and display an icon corresponding to an image processing in the standby screen, wherein, when processing of the multiple print jobs proceeds to printing, the controller is configured to update the progress screen to display a text indicating that printing of the multiple print jobs is in progress;

in a case where determining that the multiple print jobs are able to be handled as the single print job, the controller is configured to, according to progress of the printing, update the progress screen to include a text indicating a number of pages that the processing has proceeded to printing and not indicating the first all page number until the first all page number is determined, and update the progress screen to include a text indicating how many pages of the first all page number have progressed to printing after the first all page number is determined, the first all page number being determined by analyzing all of the multiple print job, the first all page number being sum of a number of pages to be printed by print data included in each of the multiple print jobs; and in a case where determining that the multiple print jobs are able to be handled as respective print jobs, the controller is configured to, according to progress of the printing, update the progress screen to include a text indicating a number of pages that the processing has proceeded to printing and not indicating the second all page number until the second all page number of the one of the respective print jobs is determined, and update the progress screen to include a text indicating how many pages of the second all page number have progressed to printing after the second all page number of the one of the respective print jobs is determined, the second all page number being determined by analyzing one of the respective print jobs, the second all page number being sum of a number of pages to be printed by print data included in the one of the respective print jobs, in a case where printing of one of the respective print jobs is completed, the controller being configured to, for a next one of the respective print jobs, according to progress of the printing, update the progress screen to include a text indicating a number of pages that the processing has proceeded to printing and not indicating the second all page number until the second all page number of the next one of the respective print jobs is determined, and update the progress screen to include a text indicating how many pages of the second all page number have progressed to printing after the second all page number of the next one of the respective print jobs is determined.

* * * * *